United States Patent
Nerukonda et al.

(10) Patent No.: US 12,537,521 B2
(45) Date of Patent: Jan. 27, 2026

(54) DFXNOC—A MULTI-PROTOCOL, MULTI-CAST, AND MULTI-ROOT NETWORK-ON-CHIP WITH DYNAMIC RESOURCE ALLOCATION

(71) Applicant: XILINX, INC., San Jose, CA (US)

(72) Inventors: Rambabu Nerukonda, Sunnyvale, CA (US); Albert Shih-Huai Lin, Mountain View, CA (US); Sreedhar Borra, Hyderabad (IN); Rajat Chadha, San Jose, CA (US); Amitava Majumdar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 37 days.

(21) Appl. No.: 18/138,008

(22) Filed: Apr. 21, 2023

(65) Prior Publication Data
US 2024/0356544 A1    Oct. 24, 2024

(51) Int. Cl.
*H03K 17/56*    (2006.01)
*G06F 13/40*    (2006.01)
*G06F 13/42*    (2006.01)
*G06F 15/173*   (2006.01)
*H04L 12/40*    (2006.01)

(52) U.S. Cl.
CPC ......... *H03K 17/56* (2013.01); *G06F 13/4022* (2013.01); *G06F 13/4291* (2013.01); *G06F 15/17312* (2013.01); *H04L 12/40* (2013.01)

(58) Field of Classification Search
CPC . H03K 17/56; G06F 13/4022; G06F 13/4291; G06F 15/17312; H04L 12/40
See application file for complete search history.

(56) References Cited

U.S. PATENT DOCUMENTS

| | | | | |
|---|---|---|---|---|
| 5,924,115 A | * | 7/1999 | Von Herzen | G06F 12/06 711/159 |
| 6,119,183 A | * | 9/2000 | Briel | G06F 13/4022 710/316 |
| 6,728,206 B1 | * | 4/2004 | Carlson | H04L 49/101 370/423 |
| 7,638,991 B1 | * | 12/2009 | Kobayashi | H02M 3/158 323/283 |
| 8,837,237 B2 | * | 9/2014 | Kim | G11C 16/06 365/191 |
| 9,621,481 B2 | * | 4/2017 | Stark | H04L 49/15 |

(Continued)

FOREIGN PATENT DOCUMENTS

| | | | | |
|---|---|---|---|---|
| WO | WO-0041082 A2 | * | 7/2000 | ............ H04L 49/25 |
| WO | WO-03017116 A1 | * | 2/2003 | ............ G06F 13/36 |

*Primary Examiner* — Faisal M Zaman
(74) *Attorney, Agent, or Firm* — Patterson + Sheridan, LLP

(57) ABSTRACT

Embodiments herein describe an integrated circuit (IC) device that includes a multi-protocol, multi-cast, and multi-root network-on-chip (NoC) with dynamic resource allocation (DFxNoC). A DFxNoC may include a plurality of end-points (EPs) that include functional circuitry, first and second root devices, and a bus network that includes multi-port switch circuits and a network of fixed links amongst the multi-port switch circuits, the root devices, and the EPs, where the root devices output respective first and second clocks, and where the multi-port switch circuits are dynamically configurable to route the first and second clocks to respective first and second selectable sets of one or more of the EPs over the network of fixed links.

19 Claims, 20 Drawing Sheets

(56) References Cited

U.S. PATENT DOCUMENTS

| | | | |
|---|---|---|---|
| 10,048,316 B1* | 8/2018 | Coutts | G01R 31/31937 |
| 10,621,132 B1* | 4/2020 | Camarota | G06F 13/4022 |
| 10,969,433 B1 | 4/2021 | Nerukonda et al. | |
| 10,998,901 B2* | 5/2021 | Prevost | H04B 1/0458 |
| 11,010,322 B1* | 5/2021 | Morshed | G06F 13/4022 |
| 2005/0201164 A1* | 9/2005 | Barth | G11C 7/22 |
| | | | 365/189.05 |
| 2006/0020836 A1* | 1/2006 | Oikawa | G06F 1/26 |
| | | | 713/300 |
| 2007/0223496 A1* | 9/2007 | Izumi | H04J 3/08 |
| | | | 370/397 |
| 2010/0257398 A1* | 10/2010 | Alexander | G11C 11/4076 |
| | | | 713/500 |
| 2010/0303067 A1* | 12/2010 | Manohar | H04L 49/3063 |
| | | | 370/386 |
| 2014/0208138 A1* | 7/2014 | Homchaudhuri | H04W 52/0287 |
| | | | 713/320 |
| 2015/0180484 A1* | 6/2015 | Portmann | H03L 7/06 |
| | | | 327/153 |
| 2015/0364170 A1* | 12/2015 | Clovis | G11C 29/028 |
| | | | 365/189.05 |
| 2016/0259001 A1* | 9/2016 | Corso | G01R 31/318594 |
| 2018/0062426 A1* | 3/2018 | Kha | H02J 9/061 |
| 2018/0120921 A1* | 5/2018 | Yifrach | G06F 13/4273 |
| 2018/0285305 A1* | 10/2018 | Pappu | G06F 13/4022 |
| 2019/0196924 A1* | 6/2019 | Gregg | G06F 13/105 |
| 2019/0303311 A1* | 10/2019 | Bilski | G06F 13/1657 |
| 2020/0304395 A1* | 9/2020 | Schimke | H04L 43/12 |
| 2021/0357347 A1* | 11/2021 | Li | G06F 13/4022 |
| 2022/0156211 A1* | 5/2022 | Ooi | G06F 15/7807 |
| 2022/0164304 A1* | 5/2022 | Dower | G06F 13/4068 |
| 2022/0253117 A1* | 8/2022 | Lee | G05F 1/59 |
| 2022/0278745 A1* | 9/2022 | Qu | H04J 3/0641 |
| 2022/0398207 A1* | 12/2022 | Norrie | G06F 13/4022 |
| 2023/0026653 A1* | 1/2023 | Lambert | G06F 13/20 |
| 2024/0103561 A1* | 3/2024 | Pang | G06F 1/3237 |
| 2024/0143434 A1* | 5/2024 | Akavaram | G06F 13/4221 |

\* cited by examiner

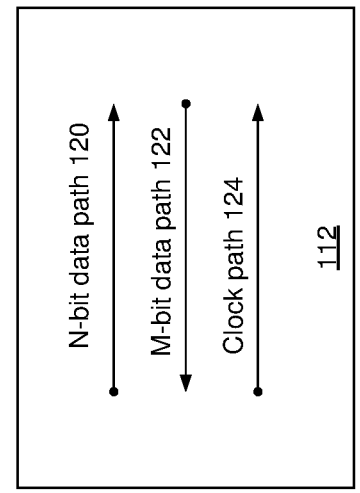
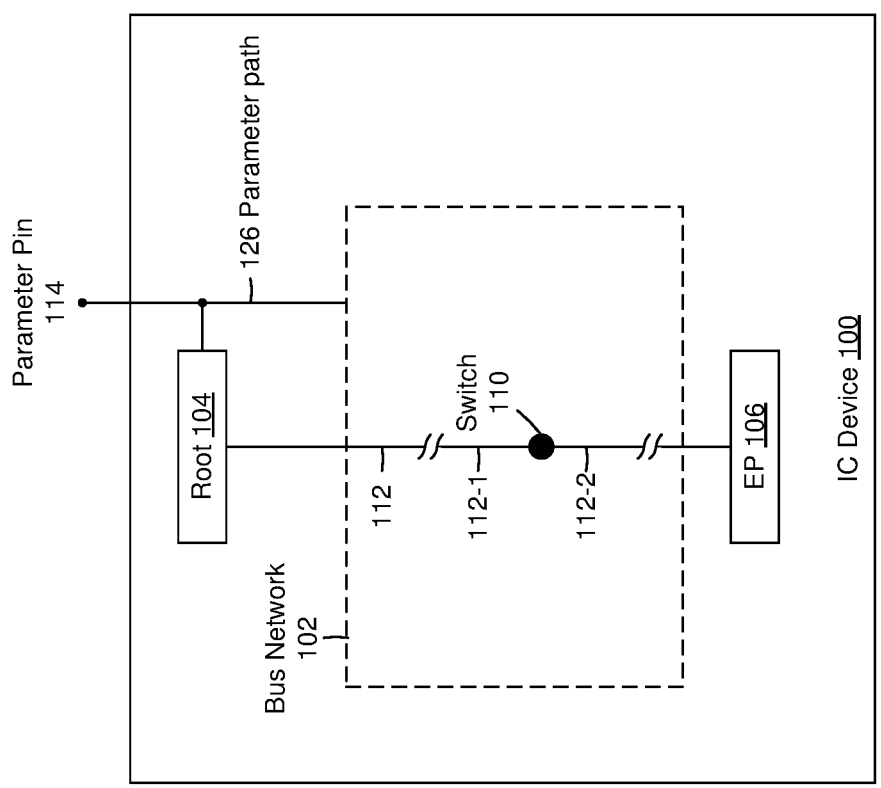

DFXNOC—A MULTI-PROTOCOL, MULTI-CAST, AND MULTI-ROOT NETWORK-ON-CHIP WITH DYNAMIC RESOURCE ALLOCATION

TECHNICAL FIELD

Examples of the present disclosure generally relate to a multi-protocol, multi-cast, and multi-root network-on-chip (NoC) with dynamic resource allocation.

BACKGROUND

Integrated circuit (IC) devices may be factory-tested prior to deployment. Testing may include functional tests, which require in-depth understanding of the circuitry in order to design and validate the functional tests, design-specific circuitry to support the functional tests, and substantial time to execute the tests. As the complexity of IC devices increases, design, verification, and execution of functional tests require increasingly greater resources. For these reasons, the industry has transitioned to pattern-based testing, referred to as structural or scan testing.

Scan requires modifications of an IC design. For example, flip-flops may be added to an IC design (and/or existing flip-flops of the IC design may be modified) to function as stimulus and observation points, or scan cells, during scan testing. The scan cells are linked together into scan chains that act as shift registers when the IC is placed in test mode. An external device then provides test pattern data to the IC device, the IC device is briefly placed in a functional (e.g., normal operating) mode, and test response data is captured. With each repetition, new test data is loaded and response data captured during the preceding cycle is shifted out to the external device for evaluation.

Both functional testing and scan testing necessitate dedicated circuitry and communication paths that are specific to the IC device, the test type, and communication protocol, and have no use beyond the specific test for which they are designed.

Where an IC device includes a field-programmable gate array (FPGA), a portion of the FPGA fabric may be programmed for a particular application, and a remaining/unused portion of the fabric may be temporarily configured to test the programmed portion as well as hard (non-FPGA) blocks connected to the fabric. However, many IC devices do not include a FPGA, and those that do may lack sufficient unused fabric to configure for testing.

SUMMARY

Techniques for providing a multi-protocol, multi-cast, and multi-root network-on-chip (NoC) with dynamic resource allocation are described.

One example is an integrated circuit (IC) device that includes a plurality of end-points (EPs) that include functional circuitry, a root device, and a bus network that includes multi-port switch circuits and a network of fixed links amongst the multi-port switch circuits, the root device, and the EPs, where the first root device outputs a first clock to the bus network, and where the multi-port switch circuits are dynamically configurable to route the first clock from the first root device to a selectable set of one or more of the EPs over the network of fixed links.

Another example described herein is an IC device that includes a plurality of EPs, first and second root devices, and a bus network comprising multi-port switch circuits and a network of fixed links amongst the multi-port switch circuits, the first and second root devices, and the EPs, wherein the first and second root devices output respective first and second clocks to the bus network, and where the multi-port switch circuits are dynamically configurable to route the first and second clocks to respective first and second selectable sets of one or more of the EPs over the network of fixed links.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 1A is a block diagram of an integrated circuit (IC) device that includes a bus network that interfaces between a root device and an end-point (EP), according to an embodiment.

FIG. 1B depicts a communication path of the bus network, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1C:
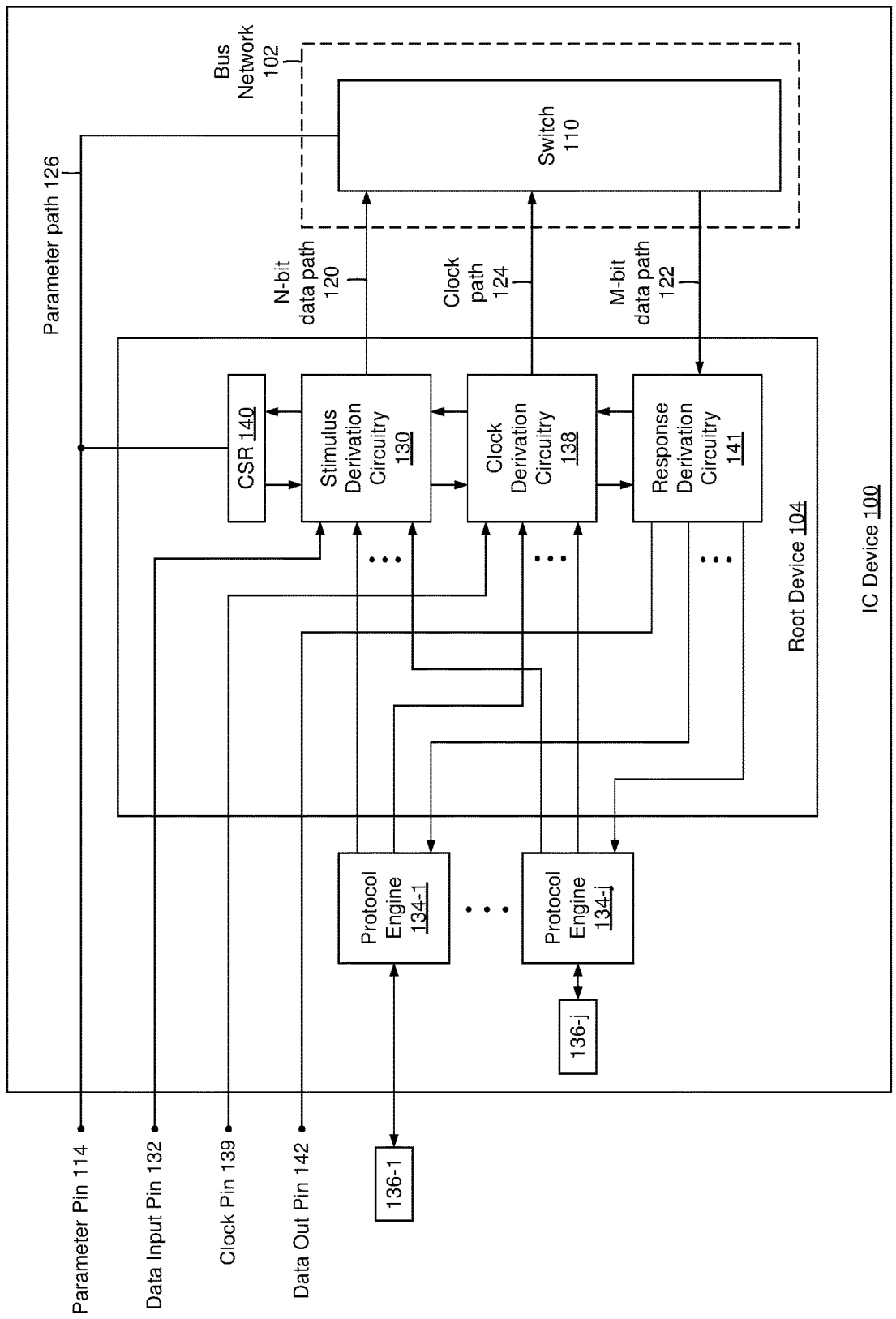
FIG. 1C is block diagram of the IC device, including features of the root device, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a multi-protocol, multi-cast, and multi-root network-on-chip (NoC) with dynamic resource allocation, referred to herein as a DFxNoC.

A DfxNoC, as disclosed herein, includes a dynamically configurable, protocol-agnostic, bus network that interfaces between one or more root devices and one or more endpoints (EPs). The bus network includes a network of fixed communication path segments/links, and dynamically configurable multi-port switch circuits disposed at intersections of the links.

The EPs may include fixed-function circuitry (e.g., application-specific integrated circuitry, or ASIC), programmable/configurable circuitry (e.g., a field programmable gate array, or FPGA), processor circuitry (e.g., an embedded processor), memory, a trace buffer that captures state information and provides the captured state information to a root device, and/or other circuitry. The EPs may further include interface circuitry that is tuned/configured to identify content on the bus network that is intended for the respective EPs (e.g., by interpreting a control part of the content). Root/EP tuning and protocol interpretation may be useful for overlaying one or more of a variety of protocols (including packet-switched protocols) on top.

The root device(s) provide clocks and, optionally, data to the EPs and receive response data from the EPs through the bus network. The multi-port switch circuits are dynamically configurable to dynamically define and redefine root domains of EPs, where a root domain is a set of EPs that receive a clock from the same root device. Where there are multiple root devices, a first root device may access EPs within a root domain of the first root device, while a second root device accesses EPs within root domain of the second root device. The first root device may be precluded from accessing EPs outside of the root domain of the first device, and the second root device may be precluded from accessing EPs outside of the root domain of the second device. Each root domain may be configured for a respective communication protocol, and may be dynamically reconfigurable for different protocols. Example protocols include, without limitation, scan, debug, fuse distribution, and functional test protocols. In an embodiment, bits of a data bus may be partitioned such that distinct subsets of bits may be used for different protocols from the same root device, provided that the root device supports multiple protocols.

The DfxNOC may be useful for testing (e.g., functional testing and/or scan testing), debugging, initializing, characterizing, and/or monitoring of EPs. The DfxNoC may be dynamically reconfigurable to accommodate multiple types of tests, multiple communication protocols, multiple root domain configurations, and/or multiple purposes (e.g., testing, debug, and/or monitoring). The DfxNoC may thus be useful for manufacturer-based purposes (e.g., testing and/or debugging), and in the field (e.g., as general purpose input/output (GPIO) circuitry, for monitoring purposes, for retrieving data from EPs, and/or for providing data for electronic fuses).

The DfxNoC may be dynamically configurable for multicasting (e.g., concurrent testing of multiple homogenous and/or heterogeneous EPs, bandwidth optimization (e.g., dynamic allocation of subsets of bus bits to individual EPs), resource allocation, re-configuration of multi-root domains, frequency upshifting/downshifting, latency balancing, and/or self-testing of communication paths and components (e.g., to detect stuck and/or transition faults within the DfxNoC). The DfxNoC may be dynamically reconfigurable to permit a root device to test various subsets of EPs in a sequential manner (e.g., using multiple respective test types and/or protocols).

The DfxNoC may be dynamically reconfigurable for various protocols, which may be useful to re-use the DFxNoC for multiple purposes (e.g., testing, debugging, programming electronic fuses, and/or monitoring). Various protocols may be simultaneously active in the DfxNoC with different subsets of bits dedicated to each active protocol.

The DFxNoC may include configuration status registers (CSRs) distributed throughout that parameterize/configure the switch circuits (e.g., to define root domains and EP access routes), and a parameter path that distributes configuration parameters to the CSRs (e.g., based on an IJTAG protocol). A CSR programming tool may dynamically reconfigure the CSRs based on a schedule or sequence of desired testing configurations.

A design tool may be provided with a software-based generic multi-port switch circuit, also referred to as a soft intellectual property (soft-IP) switch circuit. During a design phase, instances of the soft-IP switch circuit may be placed throughout an IC design, along with associated links amongst the soft-IP switch circuits, root devices, and EPs. The design tool may then parameterize/configure/populate each instance of the soft-IP switch circuit based on the respective placement.

FIG. 1A is a block diagram of an integrated circuit (IC) device 100 that includes a bus network 102 that interfaces between a root device 104 and an end-point (EP) 106, according to an embodiment. EP 106 may include fixed-function circuitry, programmable/configurable circuitry, processor circuitry, memory, a trace buffer, and/or other circuitry.

Root device 104 may use bus network 102 to communicate with EP 106, such as to test, debug, and/or monitor EP 106. Root device 104 may serve as a source of data and clocks to bus network 102, and as a receptor of responses and status. IC device 100 may include a parameter network that tunes root device 104 and EP 106 to communicate with one another using a predetermined communication protocol. As described in examples further below, root device 104 may communicate with multiple EPs 106 with multiple respective communication protocols. Root device 104 may test bus network 102 prior to communicating with EP 106 (e.g., using loopback circuitry embedded within bus network 102 and/or EP 106).

In the example of FIG. 1A, bus network 102 includes a multi-port switch circuit 110, illustrated here as a 2-port switch circuit, where each port is coupled to respective segments or links 112-1 and 112-2 of a communication path 112. As described in examples below, bus network 102 is protocol-agnostic in that bus network 102 may handle one or more of a variety of communication protocols. Bus network 102 may be referred to as a circuit-switched bus network.

IC device 100 may include a parameter pin 114 that receives configuration parameters from an off-chip device, and a parameter path 126 that distributes the configuration parameters to root device 104 and bus network 102. The off-chip device may provide the configuration parameters based on a protocol such as, without limitation, a Joint Test Action Group (JTAG) protocol or an IJTAG protocol, defined in Institute of Electrical and Electronics Engineers (IEEE) P1687, "Standard for Access and Control of Instrumentation Embedded within a Semiconductor Device." Parameter path 126 may represent a configuration and status register (CSR) network that runs parallel to bus network 102. Alternatively, or additionally, parameters may be distributed within IC device 100 via firmware, an instruction processor/controller and associated instructions, and/or other circuitry.

FIG. 1B depicts a communication path 112 of bus network 102, according to an embodiment. In the example of FIG. 1B, communication path 112 includes an N-bit data path 120 that provides data from root device 104, an M-bit data path 122 that returns data to root device 104, and a clock path 124 that provides a clock from root device 104. M and N are positive integers, which may be equal to one another or may differ from one another.

FIG. 1C is block diagram of IC device 100 illustrating features of root device 104, according to an embodiment. In the example of FIG. 1C, root device 104 includes stimulus derivation circuitry 130 that receives data from one or more of a variety of sources. In the example of FIG. 1C, stimulus derivation circuitry 130 may receive data from an external source through a data input pin 132 and/or from one or more blocks of protocol circuitry, illustrated here as protocol engines 134-1 through 134-j.

Protocol engines 134-1 through 134-j provide data to stimulus derivation circuitry 130 in accordance with respective communication protocols. In the example of FIG. 1C, protocol engines 134-1 through 134-j are illustrated as on-chip protocol engines. Alternatively, one or more of protocol engines 134-1 through 134-j may be off-chip. Further in the example of FIG. 1C, protocol engine 134-1 receives data (e.g., scan test data) from an off-chip device 136-1, and protocol engine 134-j receives data from on-chip circuitry 136-j, which may include, without limitation, firmware and/or hardware fuses.

Stimulus derivation circuitry 130 may include data selection circuitry (e.g., multiplexer circuitry) that outputs data from a selectable one of the multiple sources over N-bit data path 120. In FIG. 1C, root device 104 further includes a register, illustrated here as a configuration and status register (CSR) 140 that configures stimulus derivation circuitry 130 to output the data from one of the multiple sources. CSR 140 may receive configuration parameters over parameter path 126. CSR 140 may be dynamically reconfigurable to permit root device 104 to select data from each of multiple sources (e.g., to perform a sequence of tests).

In FIG. 1C, root device 104 further includes clock derivation circuitry 138 that outputs a clock from a selectable one of multiple sources, illustrated here as protocol engines 134-1 and a clock pin 139, over clock path 124, based on parameters from CSR 140.

In FIG. 1C, root device 104 further includes response derivation circuitry 141 that outputs data from M-bit data path 122 to a selectable one or more of multiple destinations, illustrated here as protocol engines 134-1 through 134-j and a data out pin 142.

In the example of FIGS. 1A and 1C, root device 104 is a circuit block within IC device 100. Alternatively, root device 104 may be off-chip.

Figure 2A:
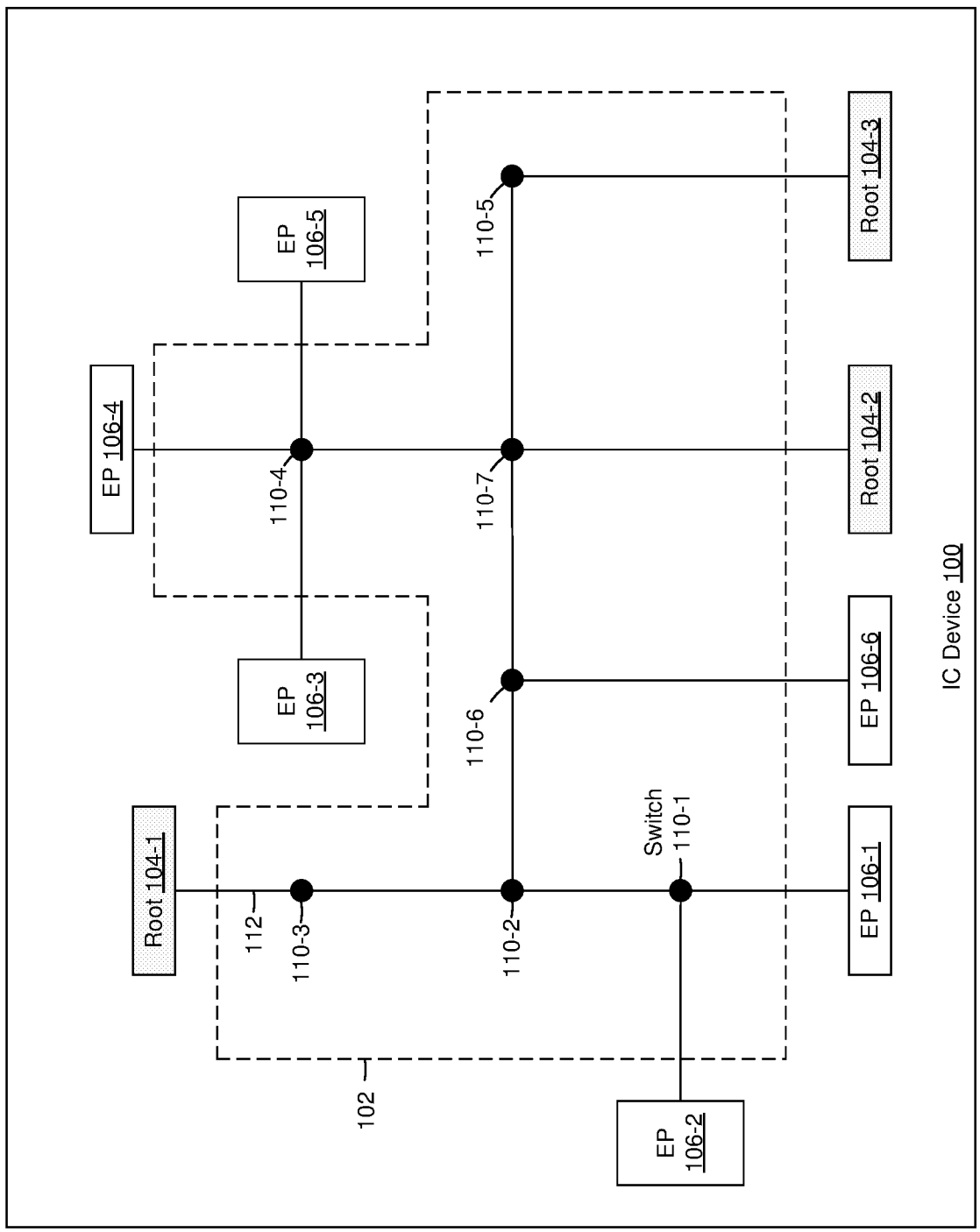
FIG. 2A is a block diagram of the IC device in which the bus network includes multiple dynamically configurable multi-port switch circuits and interconnections (e.g., fixed links) amongst the switch circuits, multiple root devices, and multiple EPs, according to an embodiment.

FIG. 2A is a block diagram of IC device 100, in which bus network 102 includes multiple dynamically configurable multi-port switch circuits 110-1 through 110-7 (collectively referred to as switch circuits 110), and interconnections (e.g., fixed links) amongst switch circuits 110, multiple root devices 104, and multiple EPs 106, according to an embodiment. In FIG. 2A, IC device includes EPs 106-1 through 106-6 (collectively, EPs 106), according to an embodiment, and root devices 104-1 through 104-3 (collectively, root devices 104). Switch circuits 110-3 and 110-5 are 2-port switch circuits (which may be useful as buffers/repeaters). Switch circuits 110-1, 110-2, and 110-6 are 3-port switch circuits. Switch circuits 110-4 and 110-7 are 4-port switch circuits. Switch circuits as disclosed herein are not, however, limited to the foregoing examples. In other embodiments, a switch circuit may be include more than 4 ports.

Figure 2B:
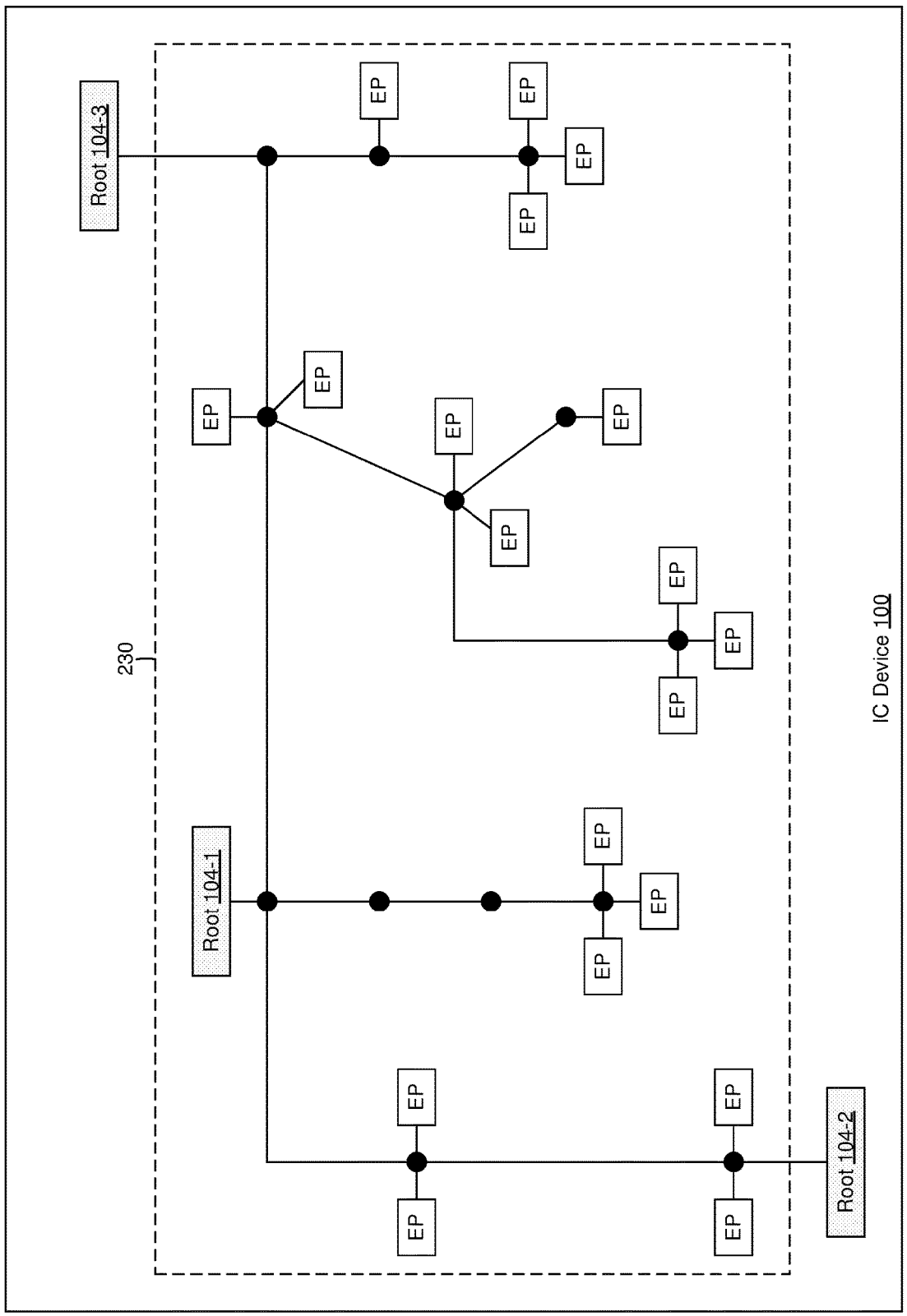
FIG. 2B is a block diagram of the IC device as illustrated in FIG. 2A, in which the dynamically configurable multi-port switch circuits are configured to permit a first one of the root devices sole access to a domain of the EPs.
Figure 2C:
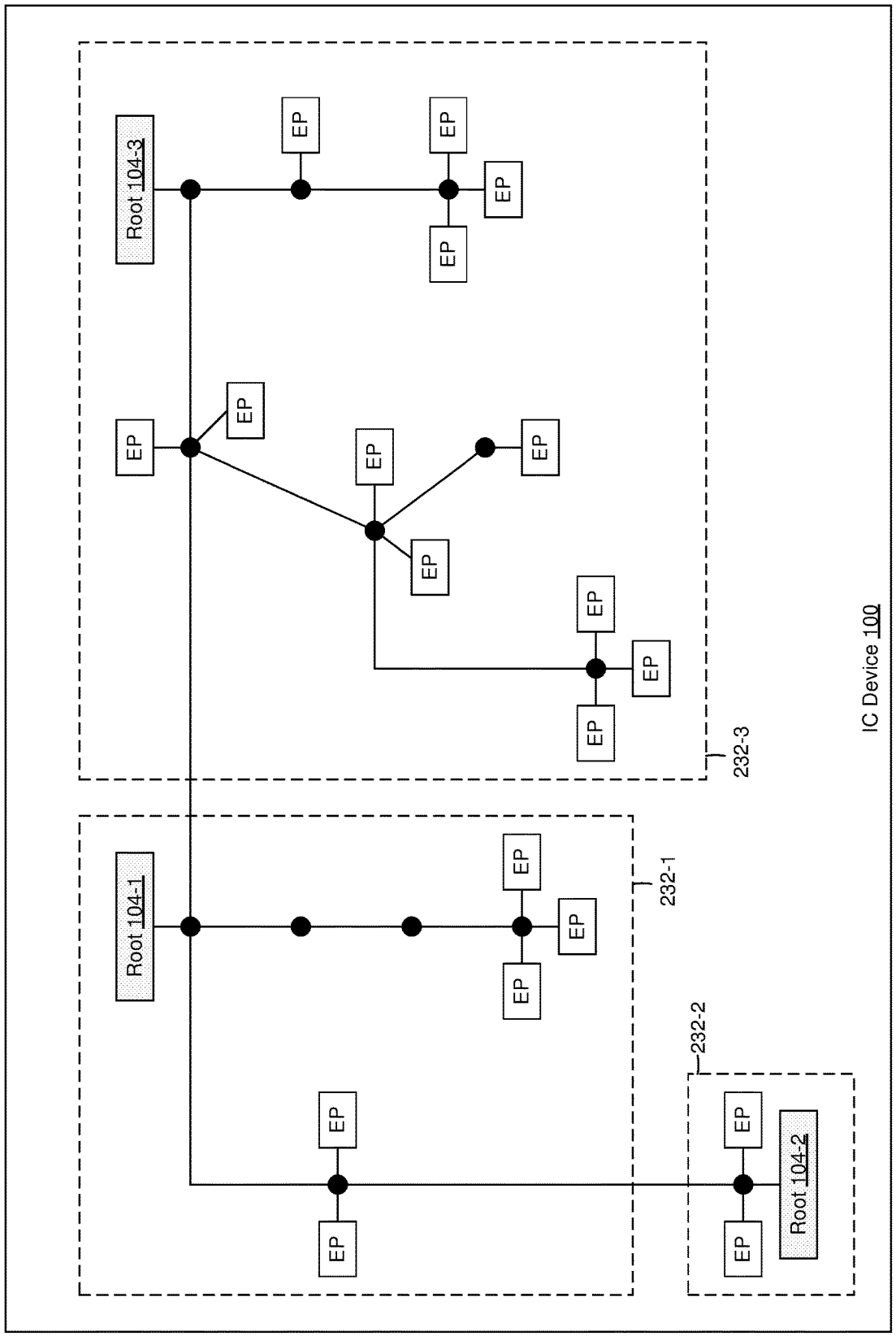
FIG. 2C is a block diagram of the IC device as illustrated in FIG. 2A, in which the dynamically configurable multi-port switch circuits are configured to permit the root devices to access respective domains of the EPs.

One or more switch circuits 110 may be configurable, via parameter path 126 and respective CSRs, to permit one of root devices 104 to access all EPs 106 or a subset thereof. One or more switch circuits 110 may be dynamically reconfigurable to permit a first root device 104 to access an EP 106 during a first phase, and to permit another root device 104 to access the EP 106 during a subsequent phase. For example, FIG. 2B is a block diagram of IC device 100, in which the dynamically configurable multi-port switch circuits, illustrated as black circles, are configured to permit root device 104-1 sole access to a domain 230 of EPs. FIG. 2C is a block diagram of IC device 100, in which dynamically configurable multi-port switch circuits, illustrated as black circles, are configured to permit root devices 104-1, 104-2, and 104-3 to access respective domains 232-1, 232-2, and 232-3 of EPs.

Bus network 102, or a portion thereof, may be arranged in a tree topology as illustrated in FIGS. 2A, 2B, and 2C, a mesh topology, and/or a ring topology.

Bus network 102 may be useful in place of, or as a substitute for a programmable logic based bus network (e.g., an FPGA-based network). Bus network 102 may be useful to provide and/or support extensive multi-site testing through a scan test platform, in the absence of programmable logic.

In an embodiment, a design tool is provided with a software-based generic multi-port switch circuit, also referred to as a soft intellectual property (soft-IP) switch circuit. During a design phase, a user or the design tool places instances of the soft-IP switch circuit throughout an IC design, with associated links amongst the soft-IP switch circuits, root devices, and EPs. The design tool then parameterizes (i.e., configures or populates) the instances of the soft-IP switch circuit based on the respective placements. A generic switch circuit may include i ports, where i is a positive integer greater than 2. An example is described below with reference to FIGS. 3 and 4.

Figure 3:
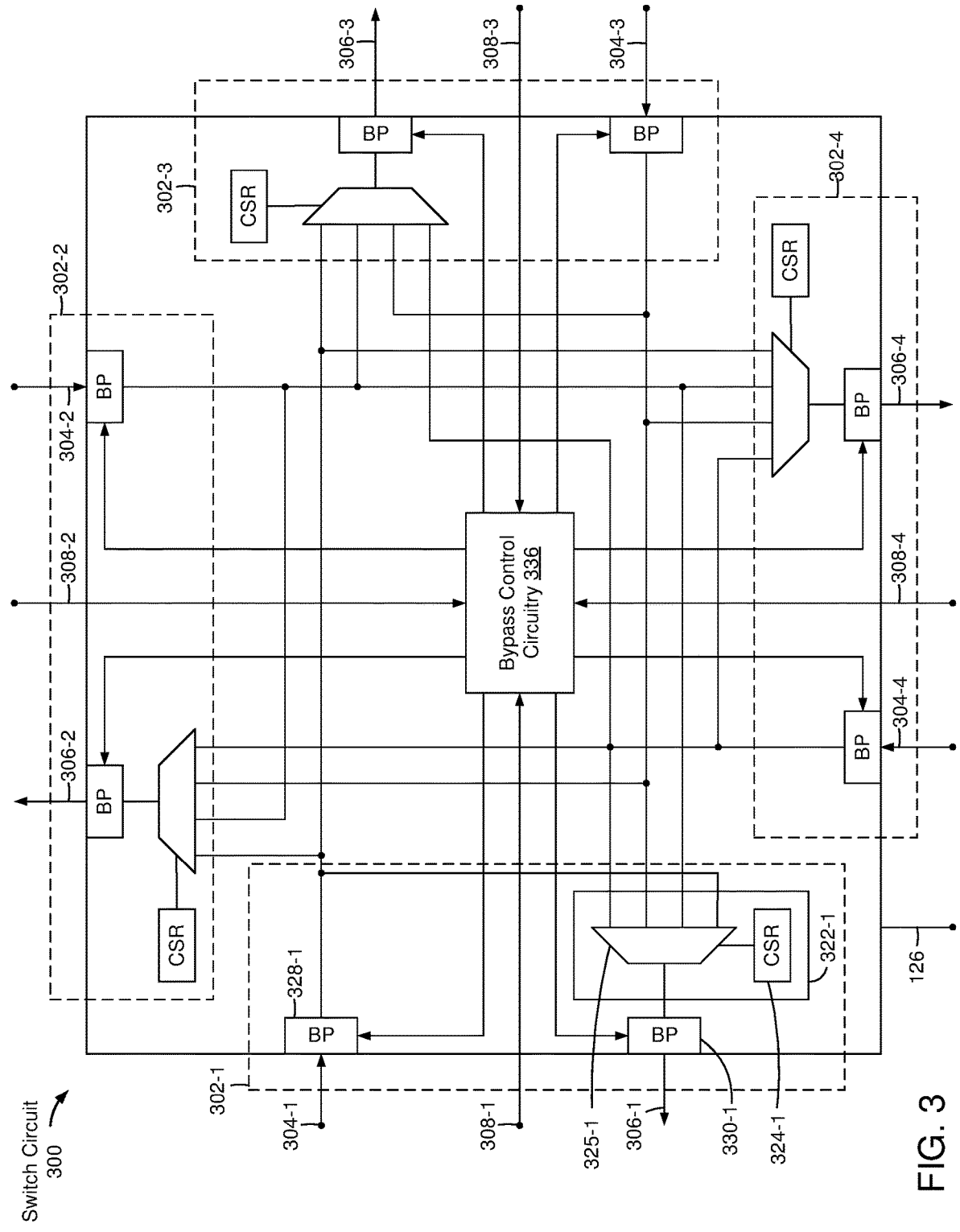
FIG. 3 is a logic diagram of data paths of a 4-port switch circuit, according to an embodiment.
Figure 4:
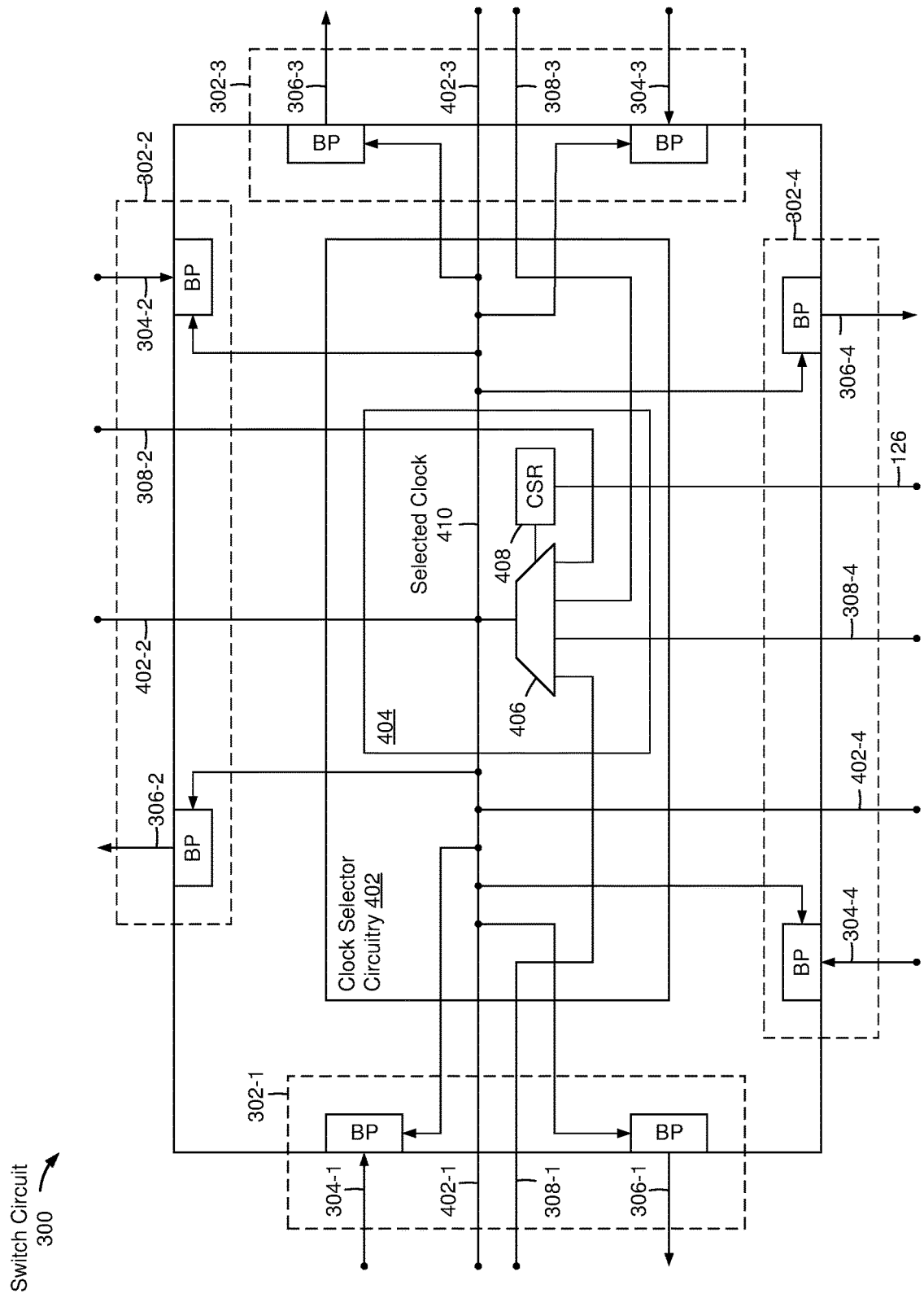
FIG. 4 is a logic diagram of clock paths of the 4-port switch circuit, according to an embodiment.

FIG. 3 is a logic diagram of data paths of a 4-port switch circuit 300, according to an embodiment. FIG. 4 is a logic diagram of clock paths of switch circuit 300, according to an embodiment. Switch circuit 300 may represent a soft-IP switch circuit of a design tool.

In FIG. 3, switch circuit 300 includes ports 302-1 through 302-4. Each port includes respective multi-bit data inputs 304-1 through 304-4, multi-bit data outputs 306-1 through 306-4, and clock inputs 308-1 through 308-4. Port 302-1 further includes data selection circuitry 322-1 that provides data received at one or more of multi-bit inputs 304 to multi-bit data output 306-1. Data selection circuitry 322-1 may include multiplexer circuitry, as illustrated in FIG. 3, and a CSR 324-1, to control data selection circuitry 322-1. CSR 324-1 may receive configuration parameters from parameter path 126.

In an embodiment, IC device 100 further includes circuitry to selectively input and/or output data synchronously or asynchronously. In the example of FIG. 3, port 302-1 further includes input synchronous/asynchronous select circuitry, illustrated here as input bypass (BP) circuitry 328-1, and output BP circuitry 330-1. In this embodiment, IC device 100 further includes bypass control circuitry 336 that controls input BP circuitry 328-1 and output BP circuitry 330-1. Input BP circuitry 328-1, output BP circuitry 330-1, and bypass control circuitry 336 are described further below with reference to FIGS. 4 and 5.

Ports 302-2, 302-3, and 302-4 include features similar to those described above with respect to port 302-1.

A port 302 of switch circuit 300 may serve as a primary access port (PAP) of a root device 104, a secondary access port (SAP), an end-point port, an unconnected port, or a leaf-switch, which are defined below.

A PAP of switch circuit 300 for root device 104 (FIG. 1) is a port 302 that is accessible from root device 104 without having to traverse through other ports 302 of switch circuit 300. In a tree topology, the PAP of a switch for a root does not change with different path configurations. Also in a tree topology, for a given domain configuration, at most one port of a switch can be a PAP for the root device of the domain. A switch circuit may be in domains of different root devices at different times and PAPs in each domain may vary based on the location of root devices.

A SAP is a port other than a PAP, for a given root-domain configuration.

An end-point port is a port that is connected directly to an EP, in a given domain configuration. In other words, an end-point port that is not directly connected to a root device is a SAP for all domain configurations. A port connected to a root device of one domain may also serve as an end-point port when bus network 102 is reconfigured to make the switch part of a domain of another root device.

A leaf-switch is a switch for which SAPs are connected to EPs or unconnected.

An unconnected port is a port that is not connected to an EP or another switch circuit. An unconnected port is at a leaf node of bus network 102.

An active root device is root device that provides clock and, optionally, data to at least a portion of bus network 102, and optionally receives associated response data from bus network 102.

In FIG. 4, ports 302-1 through 302-4 further include respective clock outputs 402-1 through 402-4, and switch circuit 300 further includes clock selector circuitry 404 that selects one of clock inputs 308-1 through 308-4 as a selected clock 410, and provides selected clock 410 to clock outputs 402-1 through 402-4. Clock selector circuitry 402 may include multiplexer circuitry 406 and a CSR 408 to control multiplexer circuitry 406. CSR 408 may receive configuration parameters from parameter path 126.

Clock selector circuitry 404 also provides selected clock 410 to input BP circuitry 328-1 through 328-4 and output BP circuitry 330-1 through 330-4 to synchronize incoming and outgoing data with selected clock 410, such as described below with reference to FIG. 5.

Figure 5:
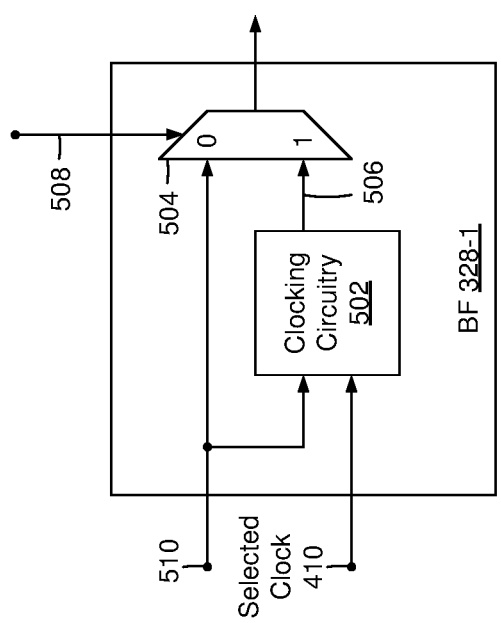
FIG. 5 is a logic diagram of input bypass (BP) circuitry of the 4-port switch circuit, according to an embodiment.

FIG. 5 is a logic diagram of a portion of input BP circuitry 328-1, according to an embodiment. In the example of FIG. 5, the portion of input BP circuitry 328-1 includes clocking circuitry 502 (e.g., a flip-flop) that synchronizes data received on a bit 510 of multi-bit data input 304-1 with selected clock 410 to provide synchronized data 506. Input BP circuitry 328-1 further includes selection circuitry, illustrated here as multiplexer circuitry 504 that outputs the data received on bit 510 (i.e., asynchronous data), or synchronized data 506, based on a control 508. Control 508 may be provided by a CSR within BF 328-1 or by a root device. Providing control 508 from a root device may reduce overhead and CSR programming time. Providing control 508 from a CSR may simplify routing and provide more flexibility. Remaining BP circuitry of switch circuit 300 may be similar to input BF circuitry 328-1. In an alternative embodiment, one or more of input BP circuitry 328-1 through 328-4 and/or output BP circuitry 330-1 through 330-4 may pass only asynchronous data or only synchronous data.

Where switch circuit 300 represents a software-based generic switch, instances of switch circuit 300 may be populated with appropriate circuitry for each switch circuit of bus network 102 during a design phase. Examples are provided below with reference to FIGS. 6 and 7.

Figure 6:
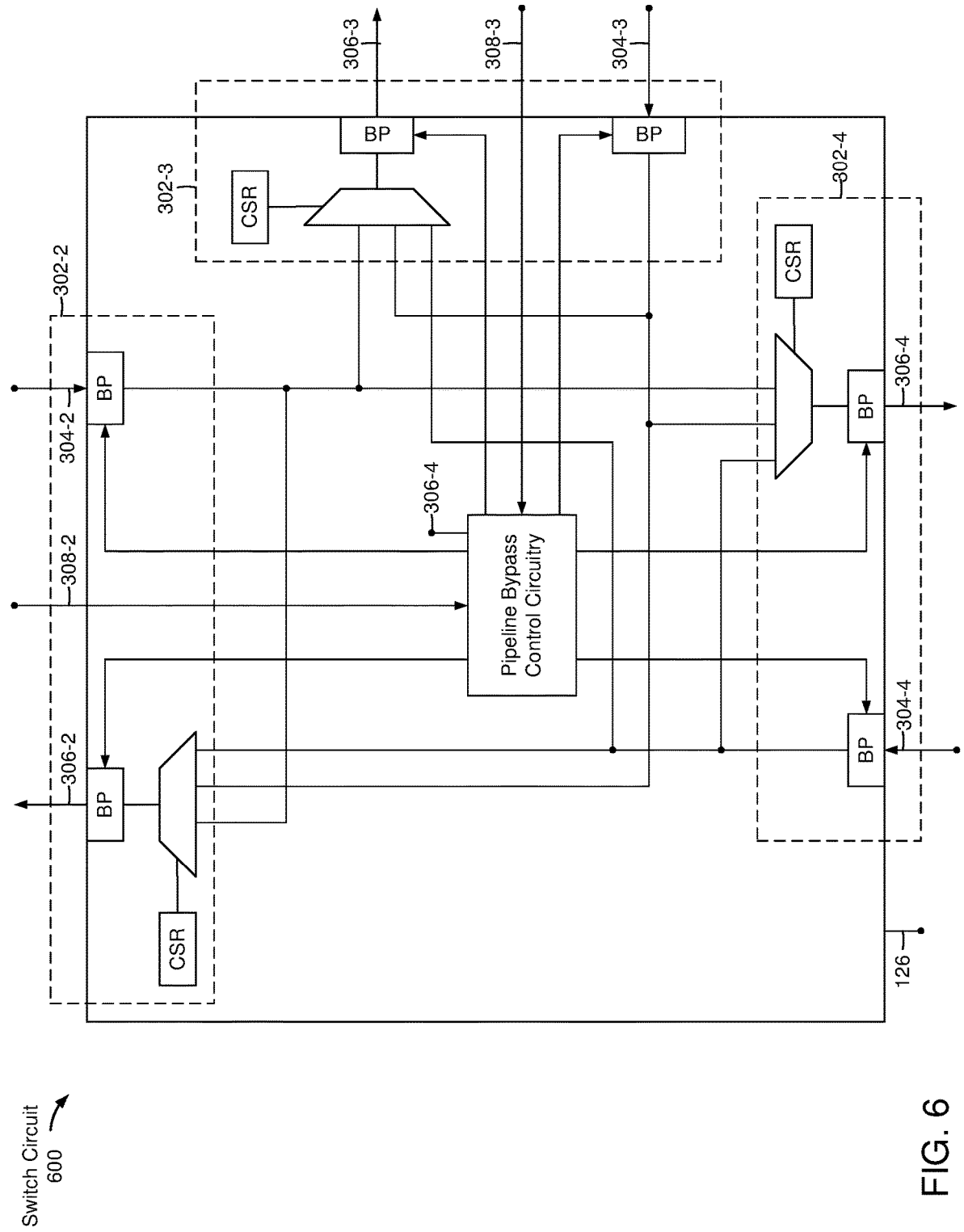
FIG. 6 is a block diagram of data paths of a 3-port switch circuit, according to an embodiment.
Figure 7:
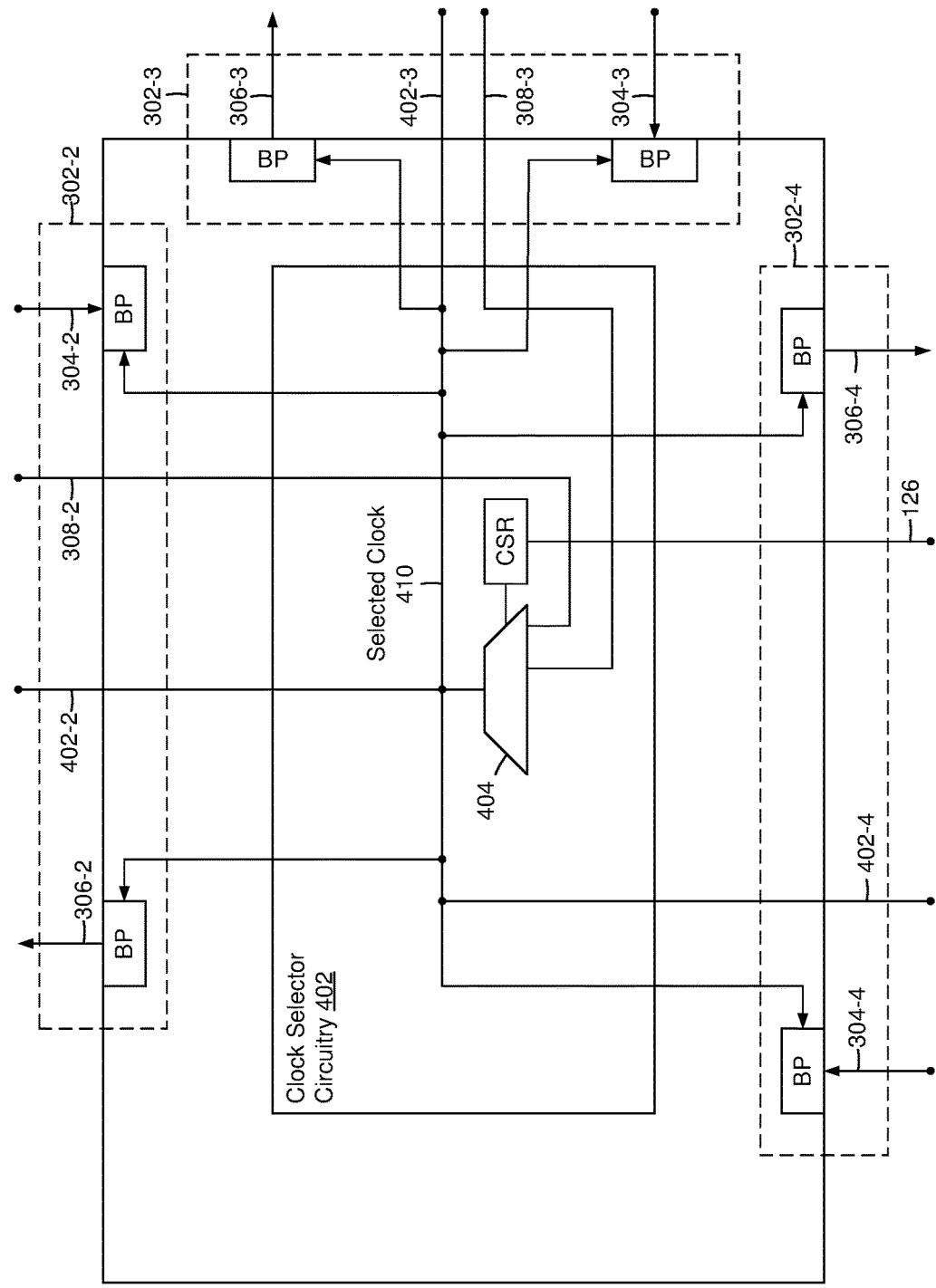
FIG. 7 is a block diagram of clock paths of the 3-port switch circuit, according to an embodiment.

FIG. 6 is a block diagram of data paths of a 3-port switch circuit 600, according to an embodiment. FIG. 7 is a block diagram of clock paths of switch circuit 600, according to an embodiment. Switch circuit 600 may represent an instance of switch circuit 300, configured as switch circuit 110-2 in FIG. 2A. In the examples of FIGS. 6 and 7, port 301-3 and clock input 308-4 of port 302-4 are omitted. In FIG. 7, clock selector circuitry 402 may select a clock received from root device 104-1 at clock input 308-2 or a clock received from root device 104-2 and/or root device 104-3 at clock input 308-3, as selected clock 410.

Figure 8:
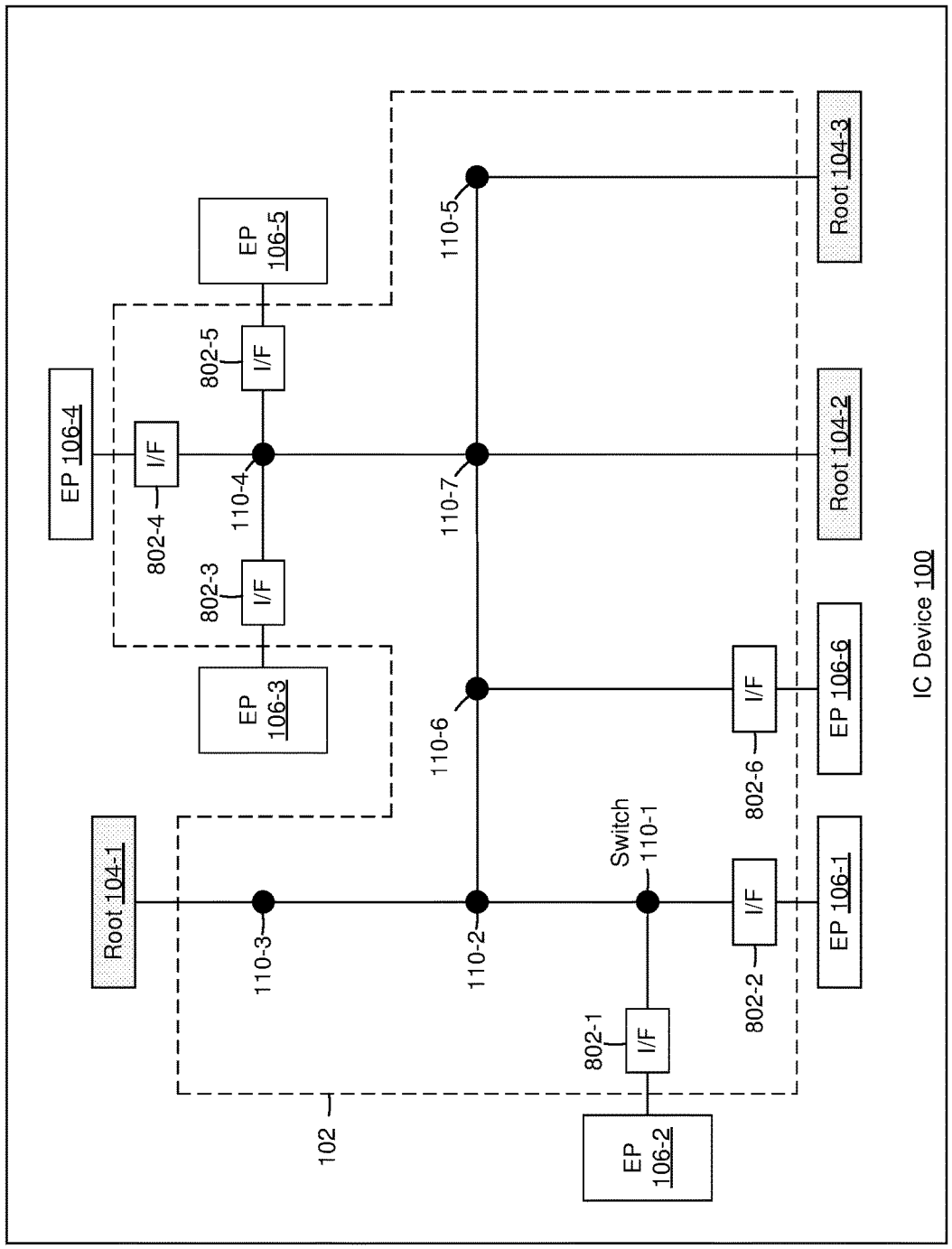
FIG. 8 is a block diagram of the IC device as illustrated in FIG. 2A, further including interface circuitry that interface between the EPs and nearest switches to the respective EPs, according to an embodiment.

FIG. 8 is a block diagram of IC device 100, further including interface circuitry 802-1 through 802-6 (collectively, interface circuitry 802), that interface between EPs 106-1 through 106-6 and respective nearest switch circuits 110, according to an embodiment. Interface circuitry 802 may include one or more features described below with reference to FIGS. 9-13 and 16.

Figure 9:
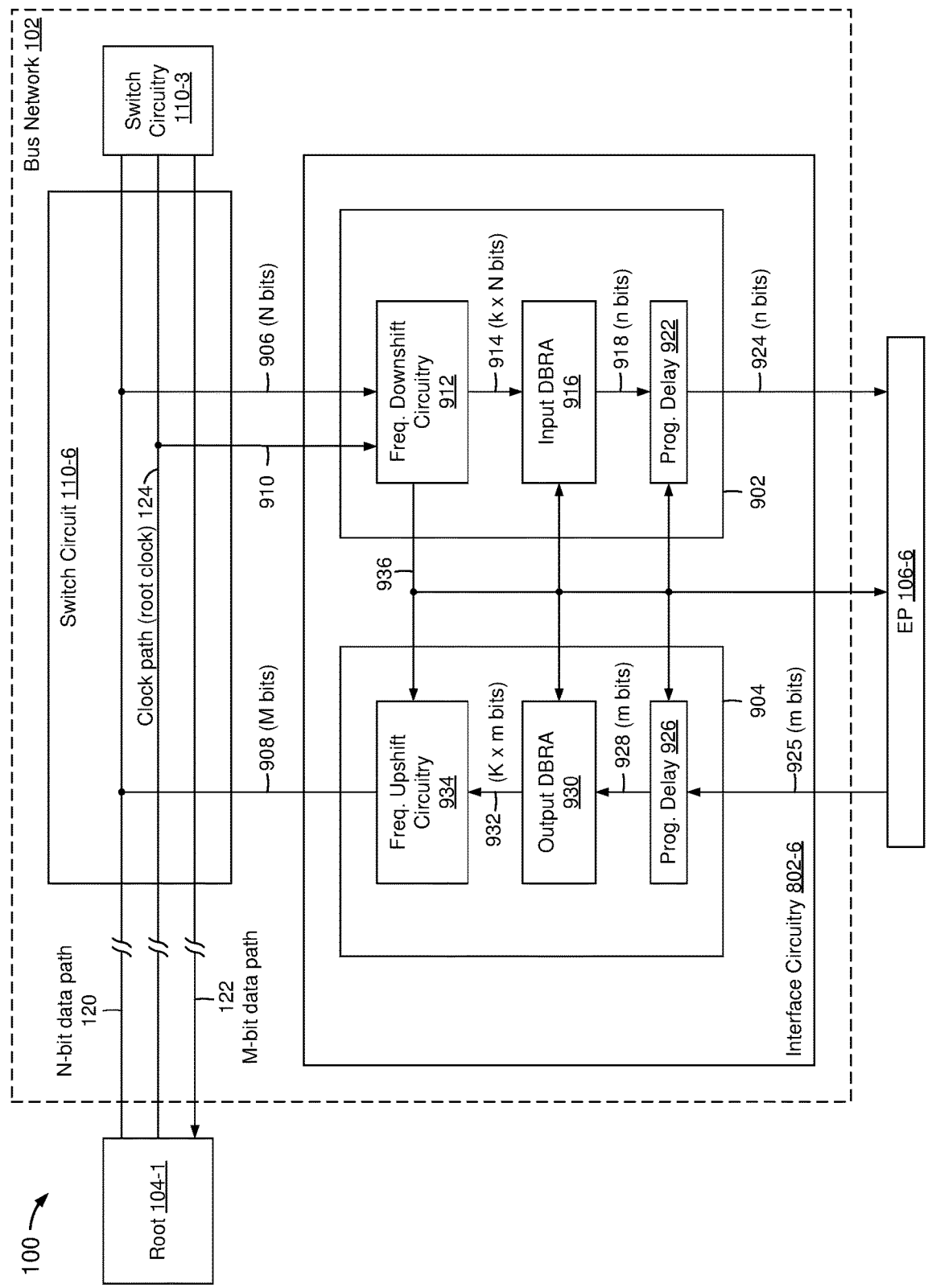
FIG. 9 is a block diagram of the interface circuitry, according to an embodiment.

FIG. 9 is a block diagram of a portion of IC device 100 to illustrate interface circuitry 802-6, according to an embodiment. One or more of interface circuitry 802-1 through 802-5 may be similar to interface circuitry 802-6 or dissimilar. Interface circuitry 802-6 includes input path circuitry 902 that receives input data from switch circuit 110-6 over an N-bit link 906, and output path circuitry 904 that provides output data to switch circuit 110-6 over an M-bit link 908. Input path circuitry 902 further receives a clock (e.g., from root device 104-1) over a clock link 910.

In the example of FIG. 9, input path circuitry 902 includes frequency downshift circuitry 912 that downshifts a clock rate of data received over N-bit link 906 by a factor of K, and outputs the downshifted data over a KxN-bit data path 914. Frequency downshift circuitry 912 may be useful where EP 106-6 operates at a lower clock rate than the clock rate of N-bit data path 120 and/or where EP 106-6 uses a data bus that is wider than N-bit data path 120.

Input path circuitry 902 further includes input dynamic bus resource allocation (input DBRA) circuitry 916 that allocates a subset of bits of KxN-bit data path 914 to an n-bit connection 918, where n is a positive integer less than or equal to KxN. Where frequency downshift circuitry 912 is omitted, input DBRA circuitry 916 may allocate a subset of bits of N-bit link 906 to n-bit connection 918. Input DBRA circuitry 916 may be useful to allocate portions of N-bit data path 120 amongst multiple EPs 106. An example embodiment of input DBRA circuitry 916 is provided further below with reference to FIGS. 11-13.

As an example, and without limitation, a first subset of bits of a link of N-bit data path 120 may be allocated to a first EP for a duration of a test of the first EP. A second subset of the bits of the link of N-bit data path 120 may be allocated to a second EP for a duration of a test of the second EP. If the duration of the first test exceeds the duration of the test of the second EP, the second subset of the bits of the link of N-bit data path 120 may be reallocated to a third EP, subsequent to the test of the second EP, for a remaining duration of the test of the first EP.

Input path circuitry 902 further includes programmable delay circuitry 922, which may be useful when data is provided over N-bit data path 120 to one or more other EPs 106 over respective paths of bus network 102, and where latencies of the other paths are greater than the path to EP 106-6. An example embodiment of programmable delay circuitry 922 is provided further below with reference to FIG. 10.

Input path circuitry 902 provides output data to EP 106-6 over an n-bit link 924.

Output path circuitry 904 receives data from EP 106-6 over an m-bit link 925, where m is a positive integer equal to or less than KxM. In an embodiment, m equals n. In another embodiment m and n differ from one another.

Output path circuitry 904 includes programmable delay circuitry 926 that delays the data received over m-bit link 925 (e.g., to align m-bit data received from EP 106-6 with data of other EPs 106). Programmable delay circuitry 926 may be similar to programmable delay circuitry 922.

Output path circuitry 904 further includes output DBRA circuitry 930 that receives data from programmable delay circuitry 926 over an m-bit connection 928, and assigns the bits of m-bit connection 928 to a subset of bits of a Kxm-bit connection 932.

Output path circuitry 904 further includes frequency upshift circuitry 934 that upshifts a clock rate of data received over Kxm-bit connection 932 by a factor of K to a rate of the clock on clock path 124, and outputs the upshifted data to switch circuit 110-6 over M-bit link 908, where M=Kxm.

In the example of FIG. 9, frequency downshift circuitry 912 provides a clock 936 to input DBRA circuitry 916, output DBRA circuitry 930, programmable delay circuitry 922, programmable delay circuitry 926, and EP 106-6. Clock 936 may represent a downshifted version of the clock received over clock link 910.

In the example of FIG. 9, input path circuitry 902 includes frequency downshift circuitry 912 and output path circuitry 904 includes frequency upshift circuitry 934. Alternatively, input path circuitry 902 may include frequency upshift circuitry and output path circuitry 904 may include frequency downshift circuitry. Alternatively, frequency upshift and downshift circuitry may be omitted, and interface circuitry 802-6 may include multiplier circuitry that receives an input indicative of an output frequency ratio (e.g., k:1), and uses the input as a multiplier (e.g., 1/k) for a number of input bits to get a desired number of output bits.

Figure 10:
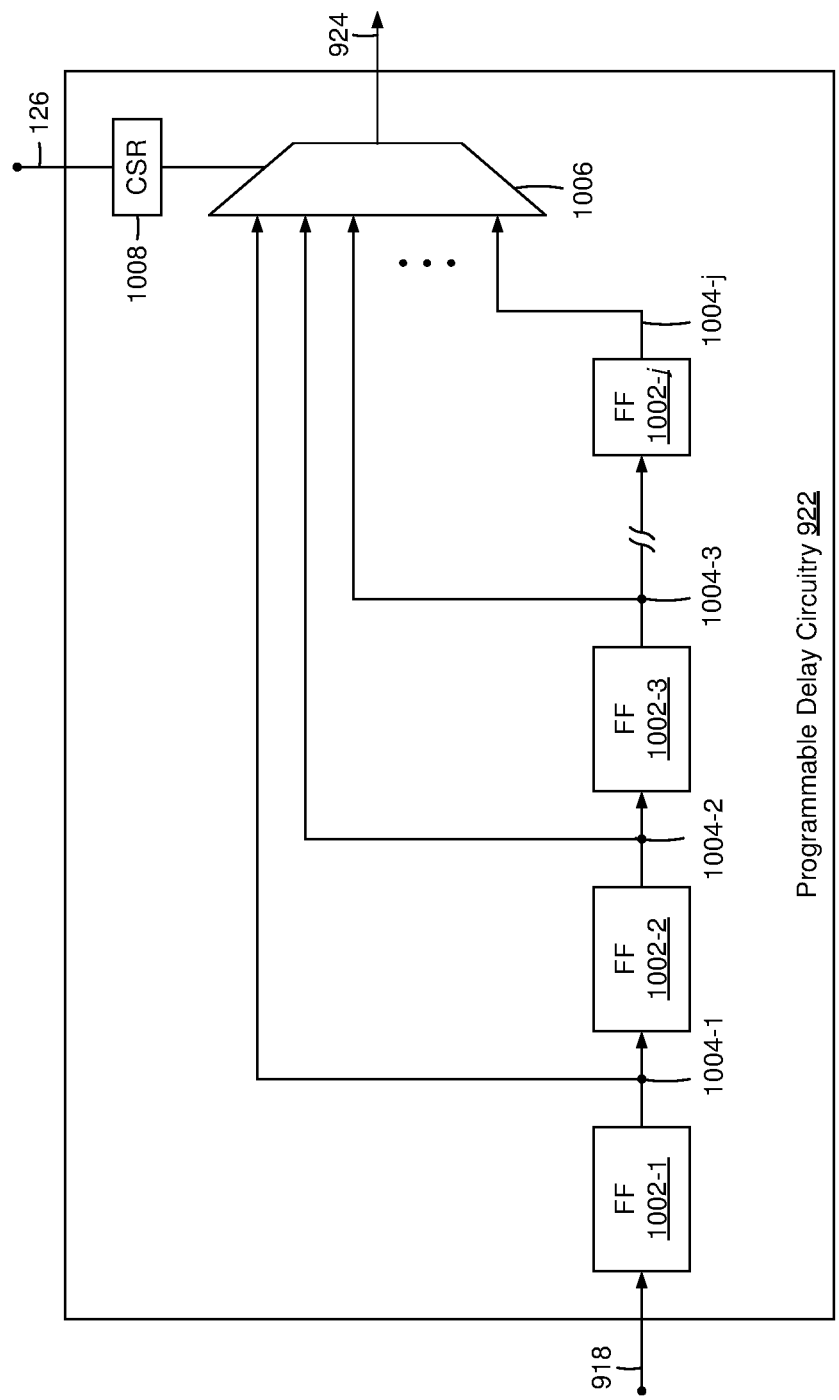
FIG. 10 is a logic diagram of programmable delay circuitry within the interface circuitry, according to an embodiment.

FIG. 10 is a logic diagram of programmable delay circuitry 922, according to an embodiment. In the example of FIG. 10, programmable delay circuitry 922 includes series-connected delay circuits, illustrated here as flip-flops 1002-1 through 1002-j, and respective taps 1004-1 through 1004-j (collectively, taps 1004). Programmable delay circuitry 922 further includes selection circuitry, illustrated here as multiplexer circuitry 1006, that receives data from taps 1004. Programmable delay circuitry 922 further includes a CSR 1008 that controls multiplexer circuitry 1006 based on parameters from parameter path 126.

Figure 11:
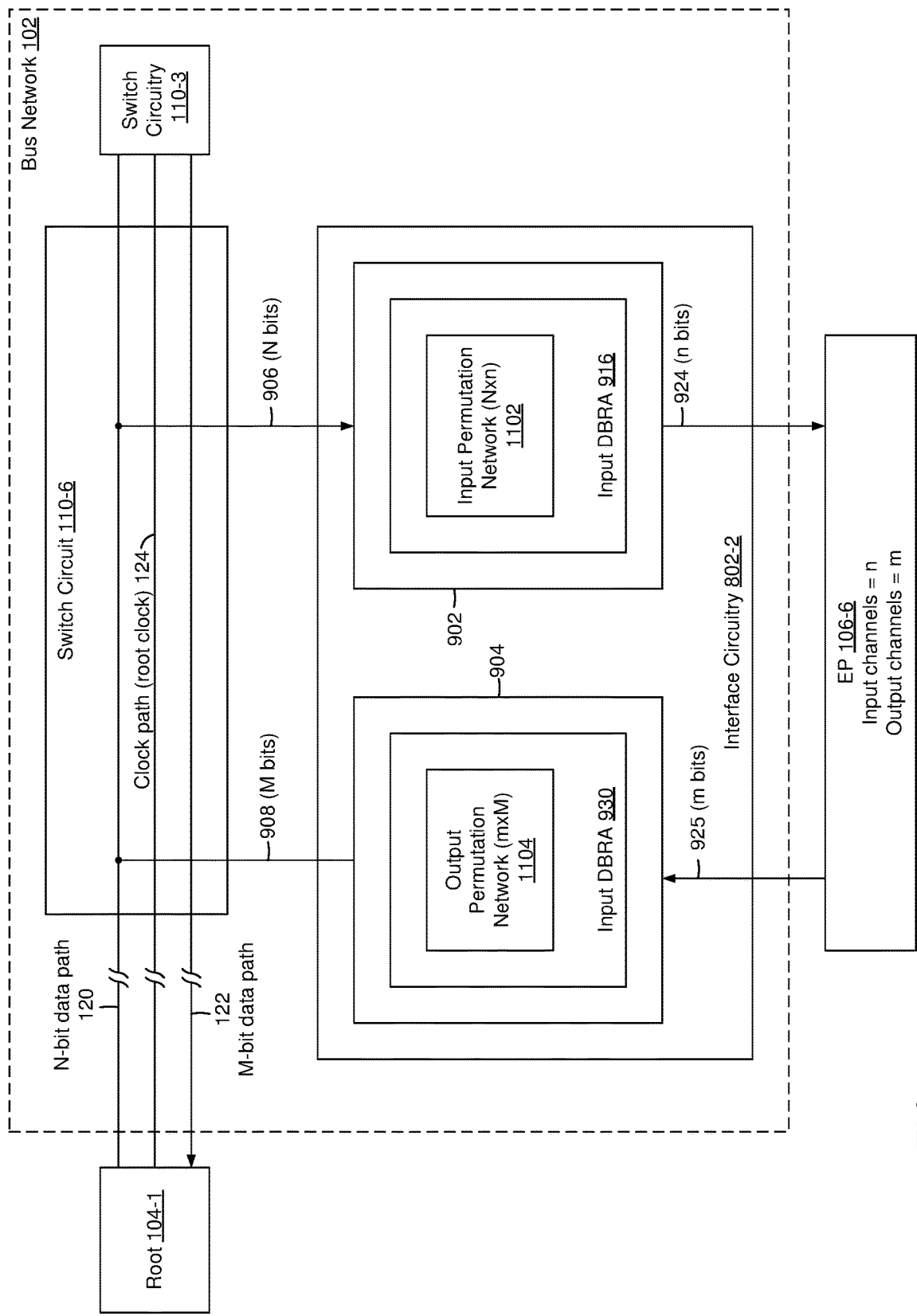
FIG. 11 is a block diagram of dynamic bus resource allocation (DBRA) circuitry within the interface circuitry, including input permutation network circuitry and output permutation network circuitry, according to an embodiment.

FIG. 11 is a block diagram of a portion of IC device 100, in which input DBRA circuitry 916 includes input permutation network circuitry 1102, and output DBRA circuitry 930 includes output permutation network circuitry 1104, according to an embodiment. For illustrative purposes, other elements of interface circuitry 802-6 illustrated in FIG. 9, are omitted from the example of FIG. 11. Input permutation network circuitry 1102 and/or output permutation network circuitry 1104 may include barrel shift circuitry that converts between N and n and/or M and m, examples of which are provided below with reference to FIGS. 12 and 13. Other permutation network circuitry may be used instead of barrel shift circuitry.

Figure 12:
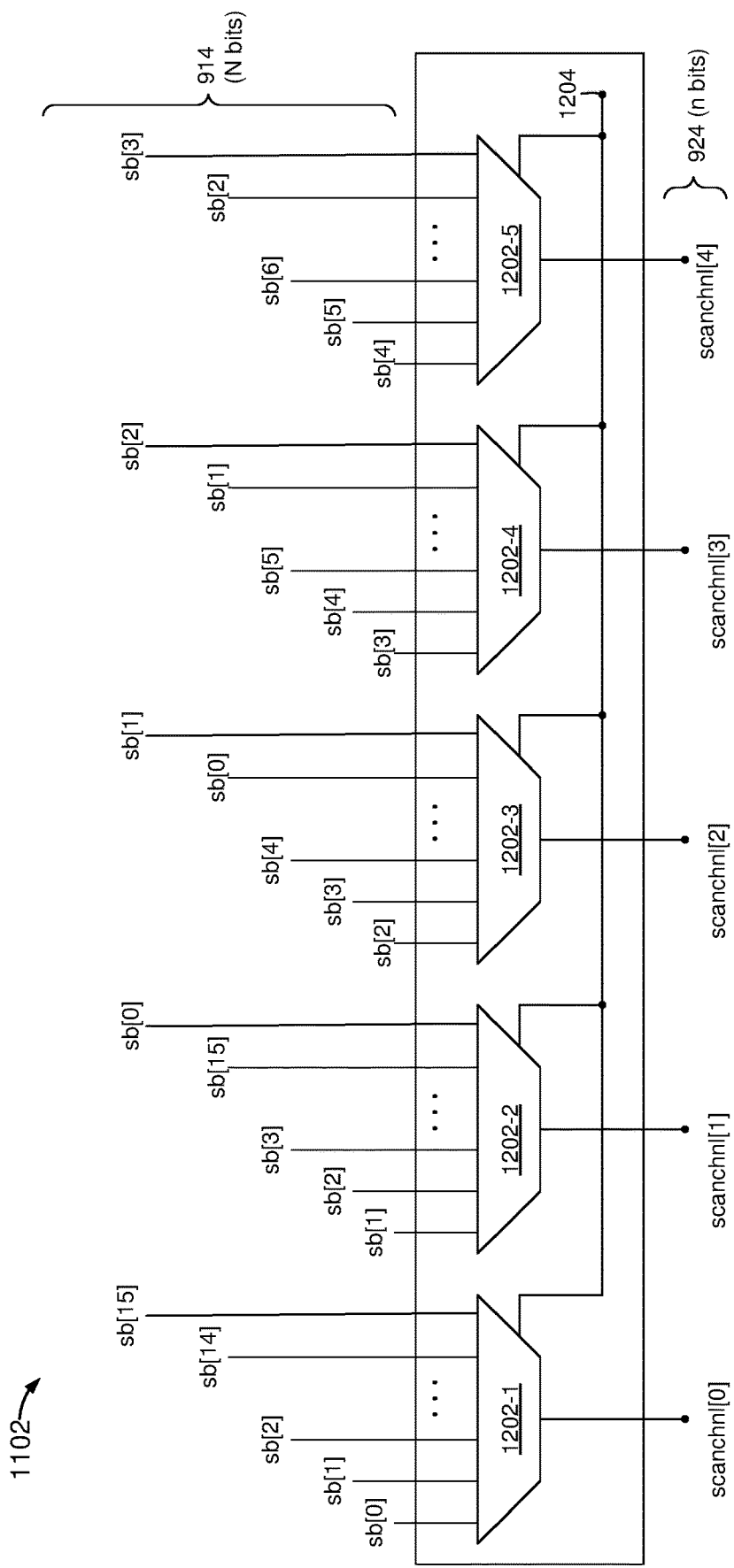
FIG. 12 is a logic diagram of the input permutation network circuitry, according to an embodiment.

FIG. 12 is a logic diagram of input permutation network circuitry 1102, for an example in which N equals 16 and n equals 5, according to an embodiment. In the example of FIG. 12, input permutation network circuitry 1102 includes barrel shift circuitry (right-shift with wrap-around), illustrated here as multiplexer circuitry 1202-1 through 1202-5, that provides a selectable subset of n=5 sequential bits of N-bit link 906 to n-bit link 924, based on a control 1204. In FIG. 12, the bits of N-bit link 906 (FIG. 11) are denoted sb[0] through sb[15], and the n bits of n-bit link 924 (FIG. 11) are denoted scanchnl[0] through scanchnl[4]. The example of FIG. 12 may represent a configuration for scan testing EP 106-6. Other bits of N-bit data path 120 may be allocated to one or more other EPs 106.

Input permutation network circuitry 1102 may include AND gates at outputs of multiplexer circuitry 1202-1 through 1202-5 to drive the outputs to a predetermined state (e.g., zero), when unused. Alternatively, EP 106-6 decides when to accept data from n-bit link 924.

Input permutation network circuitry 1102 may further include a CSR to provide control 1204 based on parameters from parameter path 126. Alternatively, control 1204 may be configured by a root device 104. Control 1204 may include 4 bits that are applied simultaneously to multiplexer circuitry 1202-1 through 1202-5, such as illustrated in Table 1 for a barrel shift permutation. Other permutations may be similarly realized using multiplexers 1202 and control 1204.

TABLE 1

| Control 1204 | scanchanl[0] | scanchanl[1] | scanchanl[2] | scanchanl[3] | scanchanl[4] |
|---|---|---|---|---|---|
| 0000 | sb[0] | sb[1] | sb[2] | sb[3] | sb[4] |
| 0001 | sb[1] | sb[2] | sb[3] | sb[4] | sb[5] |
| 0002 | sb[2] | sb[3] | sb[4] | sb[5] | sb[6] |
| ... | | | | | |
| 1111 | sb[15] | sb[0] | sb[1] | sb[2] | sb[3] |

Figure 13:
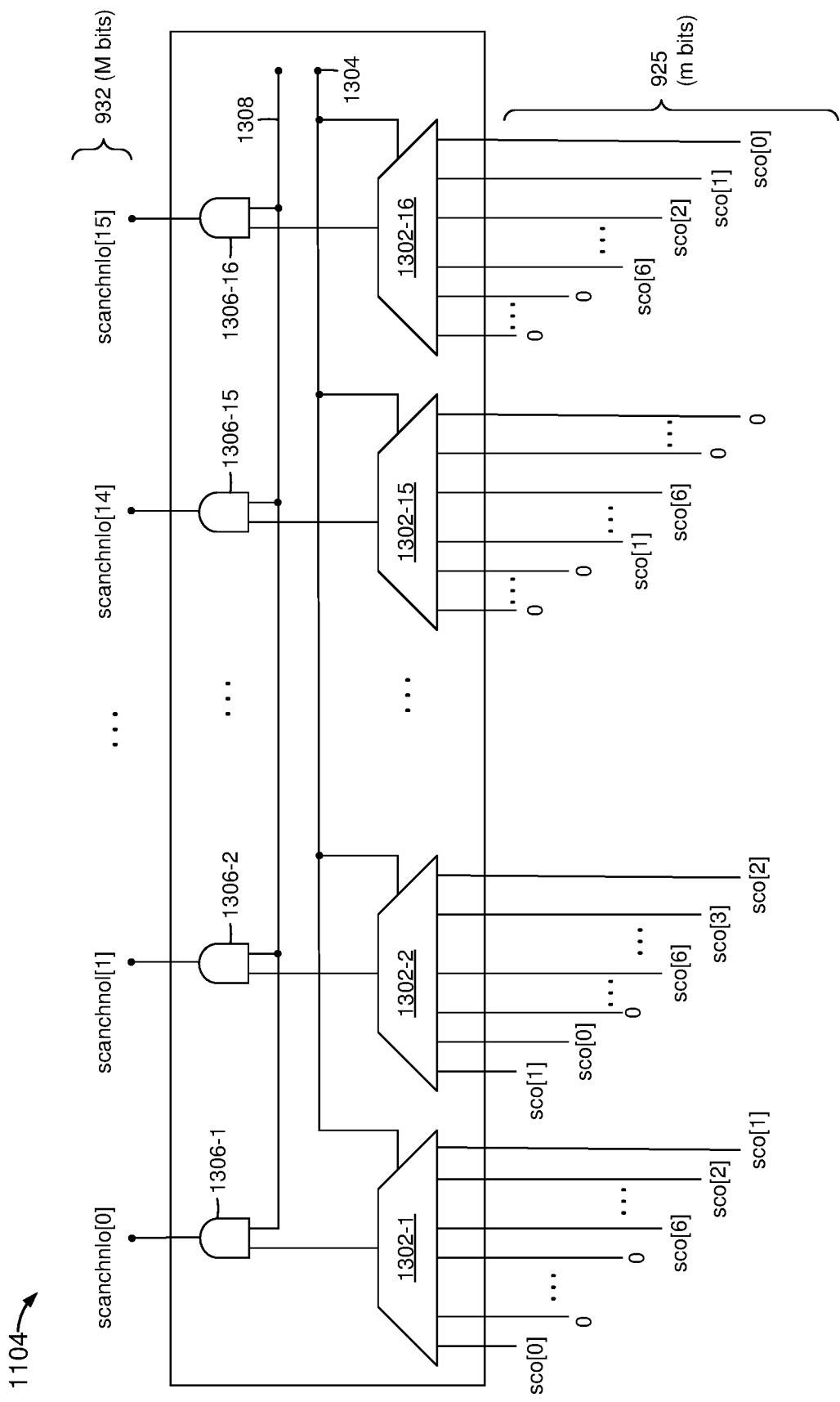
FIG. 13 is a logic diagram of the output permutation network circuitry, according to an embodiment.

FIG. 13 is a logic diagram of output permutation network circuitry 1104, for an example in which M equals 16 and m equals 7, according to an embodiment. In the example of FIG. 13, output permutation network circuitry 1104 includes barrel shift circuitry (right-shift with wrap-around, 16 rotation amounts), illustrated here as multiplexer circuitry 1302-1 through 1302-16. Multiplexer circuitry 1302-1 through 1302-16 provides the m=7 bits of m-bit link 925 to a selectable set of 7 sequential bits of M-bit link 908 based on a control 1304. In FIG. 13, the m bits of m-bit link 925 are denoted sco[0] through sco[6], and the bits of M-bit link 908 (FIG. 11) are denoted scanchnlo[0] through scanchnlo[15]. The example of FIG. 13 may be used to convey results of a scan test performed on EP 106-6.

Output permutation network circuitry 1104 may further include a CSR to provide control 1304 based on parameters from parameter path 126. Alternatively, control 1304 may be configured by a root device 104. Control 1304 may include 4 bits that are applied simultaneously to multiplexer circuitry 1302-1 through 1302-16, such as described above with reference to input permutation network circuitry 1102.

Output permutation network circuitry 1104 may further include enable circuitry, illustrated here as AND circuitry 1306-1 through 1306-16, controlled by an output enable control 1308, which may be provided by parameter path 126 or root device 104. The enable circuitry may be useful to set remaining or unused bits of M-bit link 908 to zero when the m bits of m-bit link 925 are either unused and are to be merged with bits output from one or more other EPs 106, such as described below reference to FIGS. 14 and 15

Where subsets of bits of N-bit data path 120 and M-bit data path 122 are allocated amongst multiple EPs 106, data selection circuitry (e.g., data selection circuitry 322 in FIG. 3) may include OR circuitry to combine results received from the respective EPs 106, such as described below with reference to FIGS. 14 and 15.

Figure 14:
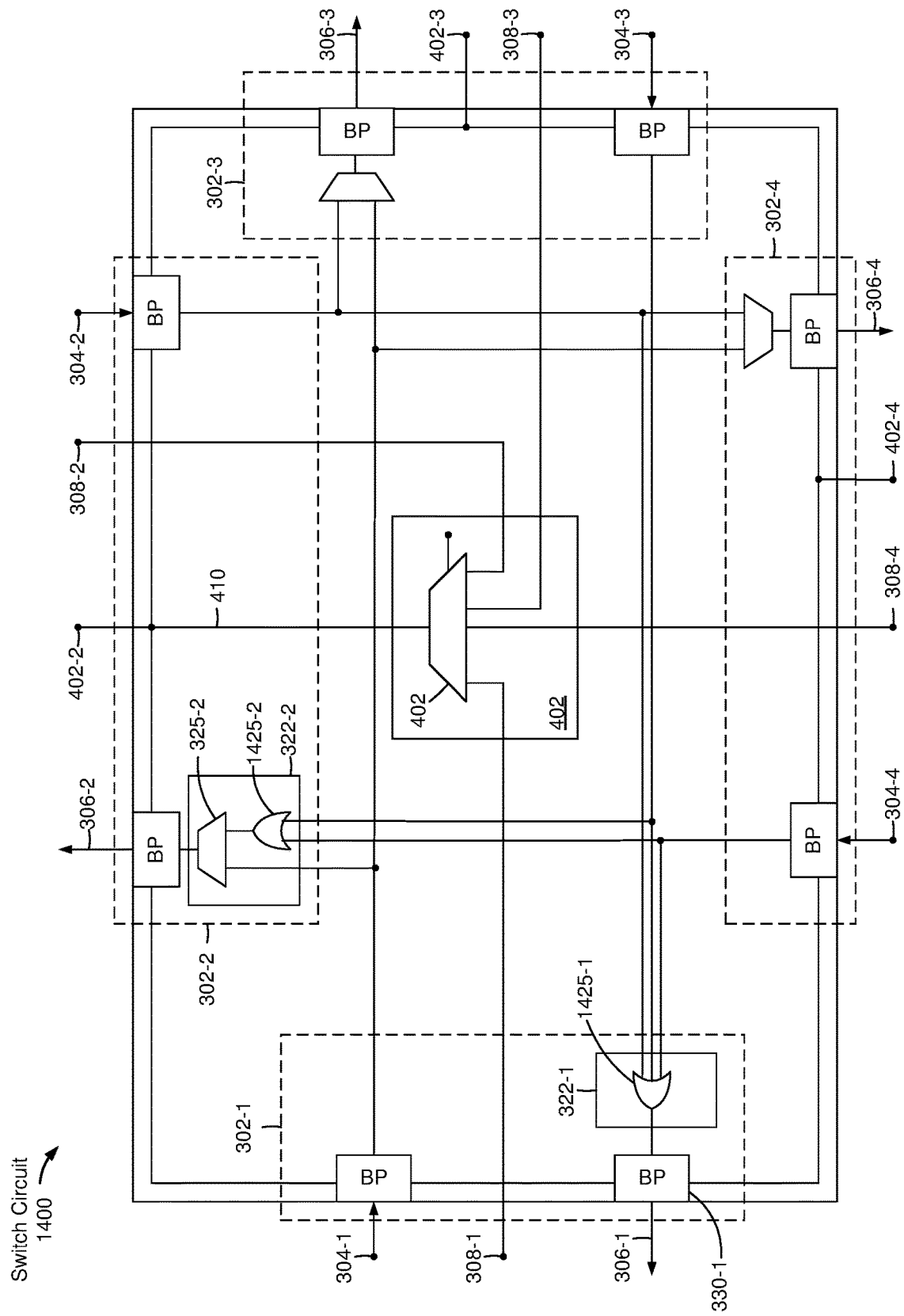
FIG. 14 is a logic diagram of a dynamically configurable multi-port switch circuit that includes OR circuitry that merges data received at multiple ports of the switch circuit onto a response data path of the bus network, where the data received at a first one of the ports is assigned to a selectable subset of bits of the response data path, according to an embodiment.

FIG. 14 is a logic diagram of a switch circuit 1400, according to an embodiment. Switch circuit 1400 includes features described above with reference to FIGS. 3 and 4, except that data selection circuitry 322-1 of port 302-1 includes OR circuitry 1425-1 in place of multiplexer circuitry 325-1 and CSR 324-1, and data selection circuitry 322-2 of port 302-2 further includes OR circuitry 1425-2.

In FIG. 14, OR circuitry 1425-1 merges bits received by ports 304-2, 304-3, and 304-4. OR circuitry 1425-1 may be useful where the data received at ports 302-2, 302-3, and 302-4 are allocated to respective sets of m bits of M-bit data path 122 (and where sets unallocated/unused bits of the respective links of M-bit data path 122 to zero), such as described above with reference to FIGS. 9, 11, 12, and/or 13. In this embodiment, OR circuitry 1425-1 essentially disregards the unused bits that are set to zero. Omission of multiplexer circuitry 325-1 and CSR 324-1 of FIG. 3 may conserve area, power, programming time (e.g., may reduce an IJTAG chain length). In addition to reducing CSR programming time, switch circuit 1400 may be useful for centralized testing that involves inactive outputs of EPs outputs, such as described further below with reference to FIG. 17.

Similarly, OR circuitry 1425-2 merges bits received at ports 302-3 and 302-4. As with OR circuitry 1425-1, OR circuitry 1425-2 may be useful where the data received at ports 302-3 and 302-4 are allocated to respective sets of m bits of the respective segments of M-bit data path 122.

Figure 15:
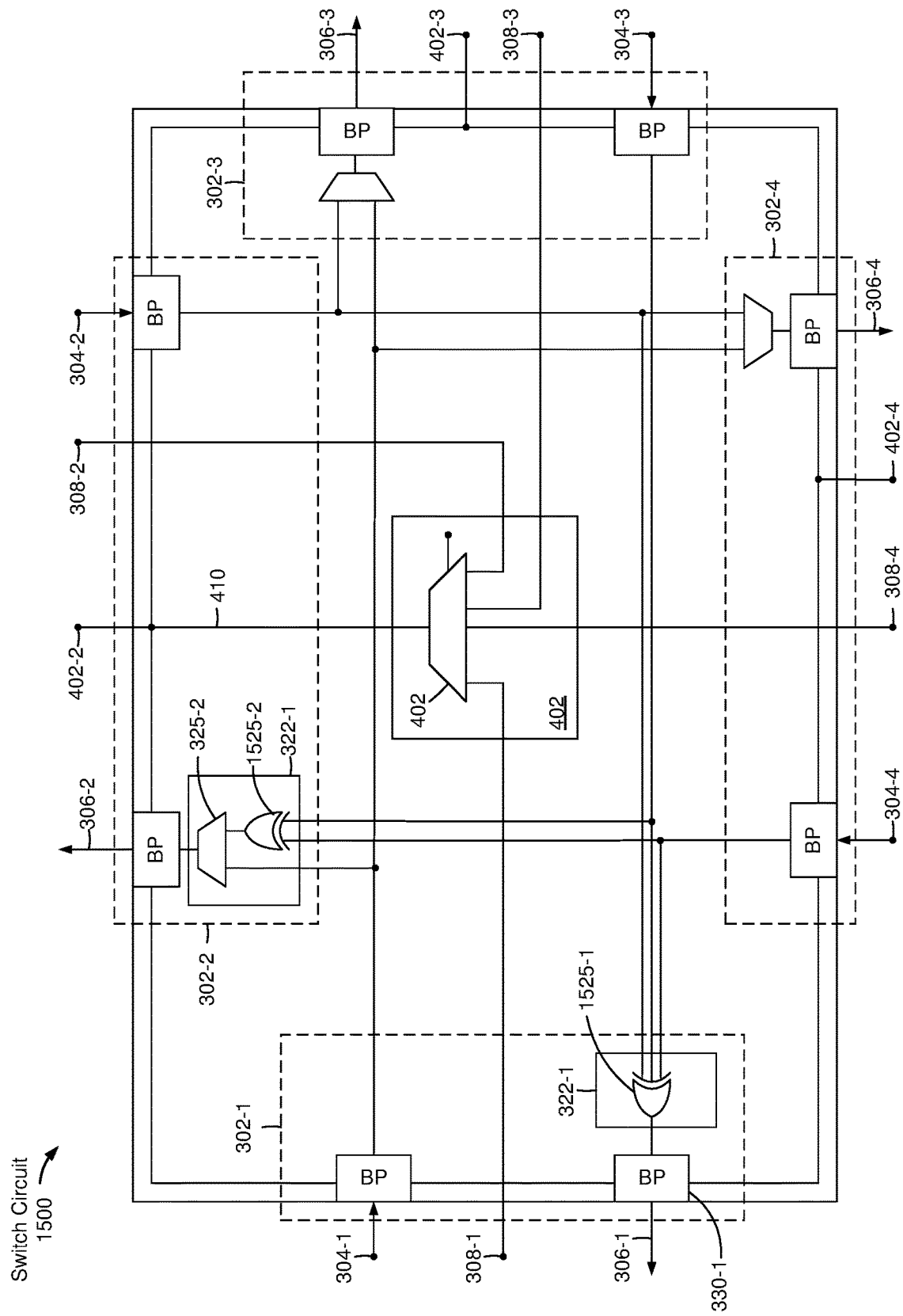
FIG. 15 is a logic diagram of a dynamically configurable multi-port switch circuit that includes exclusive OR (XOR) circuitry that merges data received at multiple ports of the switch circuit onto a response data path of the bus network, where the data received at a first one of the ports is assigned to a selectable subset of bits of the response data path, according to an embodiment.

FIG. 15 is a logic diagram of a dynamically configurable multi-port switch circuit 1500, according to an embodiment. Switch circuit 1500 includes features described above with reference to FIG. 14, except that, in FIG. 15, data selection circuitry 322-1 includes exclusive OR (XOR) circuitry 1525-1 in place of OR circuitry 1425-1, and data selection circuitry 322-2 includes XOR circuitry 1525-2 in place of OR circuitry 1425-2.

XOR circuitry 1525-1, when used throughout, may be useful to test network bus network 102, or a portion thereof, at the same time, using a signature generated by the XOR circuitry. XOR circuitry 1525-1, when used throughout, may be useful to concurrently compare results from similar EPs 106 to produce pass/fail results based on the comparison. XOR circuitry 1525-1 may be combined with AND gates to hold unused outputs at a predetermined state (e.g., zero), such as described above with reference to FIG. 13. In this example, XOR circuitry 1525-1 may serve as OR gate functionality.

OR circuitry of FIG. 14 and/or XOR circuitry of FIG. 15 may also be useful for testing link of bus network 102, such as described further below with reference to FIG. 17.

In an embodiment, bus network 102 and/or EPs 106 include loopback circuitry to permit one or more root devices 104 to test links and components of bus network 102. A root device 104 may perform loopback tests prior to utilizing bus network 102 for testing, debug and/or monitoring. Example loopback circuitry is described below with reference to FIGS. 16 and 17.

Figure 16:
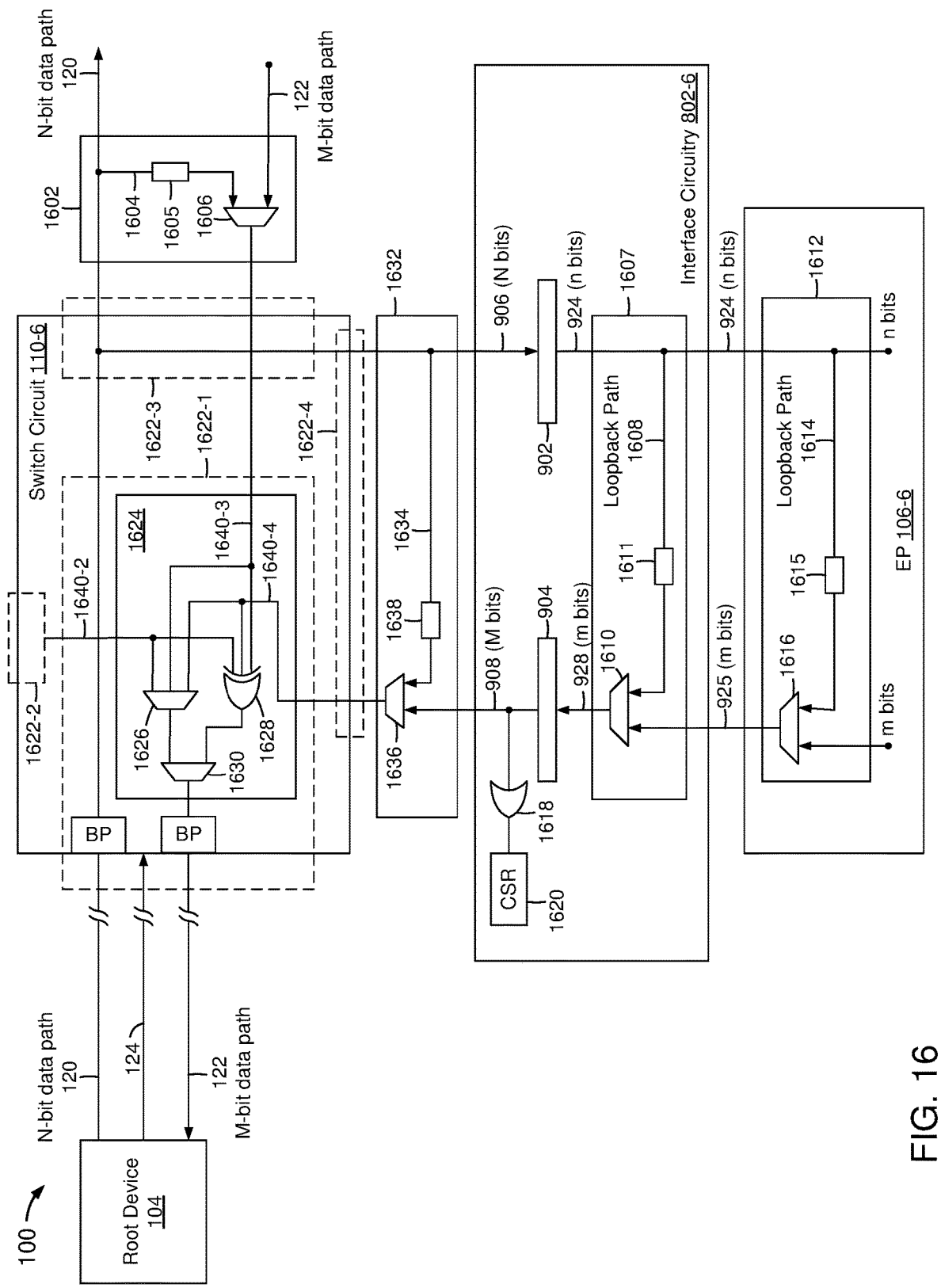
FIG. 16 is logic diagram of the IC device including multiple loopback paths, according to an embodiment.

FIG. 16 is logic diagram of a portion of IC device 100 with multiple loopback paths, according to an embodiment. For ease of illustration, FIG. 16 includes switch circuit 110-6, interface circuitry 802-6, and EP 106-6, as described in one or more examples above.

In FIG. 16, IC device 100 includes loopback circuitry 1602 coupled to data links of port 1622-3. Loopback circuitry 1602 receives loopback data over N-bit data path 120 and returns the loopback data over M-bit data path 122 via a loopback path 1604 and multiplexer circuitry 1606. Loopback circuitry 1602 may further include a CSR that configures multiplexer circuitry 1606 based on parameters received from parameter path 126. Where MAN, loopback circuitry 1602 may further include N-bit to M-bit converter circuitry 1605. Additional instances of loopback circuitry 1602 may be placed at various locations of bus network 102.

For example, in FIG. 16, IC device 100 further includes loopback circuitry 1632 coupled to data links of port 1622-4. Loopback circuitry 1632 receives loopback data over N-bit link 906 and returns the loopback data over M-bit link 908 via a loopback path 1634 and multiplexer circuitry 1636. Loopback circuitry 1632 may further include a CSR that configures multiplexer circuitry 1636 based on parameters received from parameter path 126. Where M≠N, loopback circuitry 1632 may further include N-bit to M-bit converter circuitry 1638.

Further in FIG. 16, interface circuitry 802-6 includes loopback circuitry 1607 that receives loopback data over n-bit link 924 and returns the loopback data over m-bit connection 928 via a loopback path 1608 and multiplexer circuitry 1610. Loopback circuitry 1607 may further include a CSR that configures multiplexer circuitry 1610 based on parameters received from parameter path 126. Where m≠n, loopback circuitry 1607 may further include n-bit to m-bit converter circuitry 1611. Additional instances of loopback circuitry 1607 may be placed at various locations within interface circuitry 802-6 and/or between interface circuitry 802-6 and EP 106-6.

Interface circuitry 802-6 further includes OR circuitry 1618 and a CSR 1620 that check for all-zero default values (e.g., during a loopback test). OR circuitry 1618 may be useful for testing and diagnostic purposes and/or for monitoring purposes (e.g., monitoring an inactive condition using OR circuitry 1618 and CSR 1620).

Further in FIG. 16, EP 106-6 includes loopback circuitry 1612 that receives loopback data over n-bit link 924 and returns the loopback data over m-bit connection 928 via a loopback path 1614 and a multiplexer 1616. In an embodiment, EP 106-6 includes a bus controller that interfaces with interface circuitry 802-6 and loopback circuitry 1612 is placed within the bus controller. Where m≠n, loopback circuitry 1612 may further include n-bit to m-bit converter circuitry 1615. Additional instances of loopback circuitry 1612 may be placed at various locations within EP 106-6

Further in FIG. 16, switch circuit 110-6 includes ports 1622-1 through 1622-4. Port 1622-1 includes selection circuitry 1624. Selection circuitry 1624 includes multiplexer circuitry 1626 that selects data received from one of ports 1622-1 through 1622-4 along respective M-bit data paths 1640-2, 1640-3, and 1640-4, such as described further above with reference to FIGS. 3 and 4.

Selection circuitry 1624 further includes XOR circuitry 1628 that merges M-bit data paths 1640-2, 1640-3, and 1640-4. During a loopback test of data paths through port 1622-4, switch circuit 110-6 may receive test data from root device 104 over N-bit data path 120, and may route the test data to port 1622-2. XOR circuitry 1628 may receive loopback response data from port 1622-4 over M-bit data path 1640-4. IC device 100 may include additional circuitry (e.g., multiplexer circuitry) that holds bits of M-bit data paths 1640-2 and 1640-3 to a predetermined state (e.g., logic state zero) during the loopback test of the data paths through port 1622-4 such that the output of XOR circuitry 1628 may be evaluated to deterministically detect an anomaly in the data paths through port 1622-4.

In an embodiment, one or more of ports 1622-2, 1622-3, and 1622-4 include built-in self-test (BIST) circuitry (and associated multiplexer circuitry) that insert deterministic data onto respective M-bit data paths 1640-2, 1640-3, and 1640-4, during tests of the data paths of the respective ports.

In this example, XOR circuitry may merge M-bit data paths 1640-2, 1640-3, and 1640-4, as described above.

IC device 100 may further include a multiple input signature register (MISR) that collects signatures of tests that utilize port 1622-1. The MISR may collect the signatures from outputs of multiplexer circuitry 1630 and/or XOR circuitry 1628. The MISR may be useful for testing bus network 102 and for isolating failures when a test fails. In this way, the BIST circuitry may be used for test and diagnosis.

Selection circuitry 1624 further includes multiplexer circuitry 1630 that selects outputs of multiplexer circuitry 1626 or XOR circuitry 1628 to output to root device 104 over M-bit data path 122. Multiplexer circuitry 1630 may select the output of XOR circuitry 1628 during a scan test, and may select the output of multiplexer circuitry 1626 during other operations. Multiplexer circuitry 1626 may be provided at primary access ports for bus testability purposes. Multiplexer circuitry 1626 and 1630 may be controlled by respective CRSs.

Figure 17:
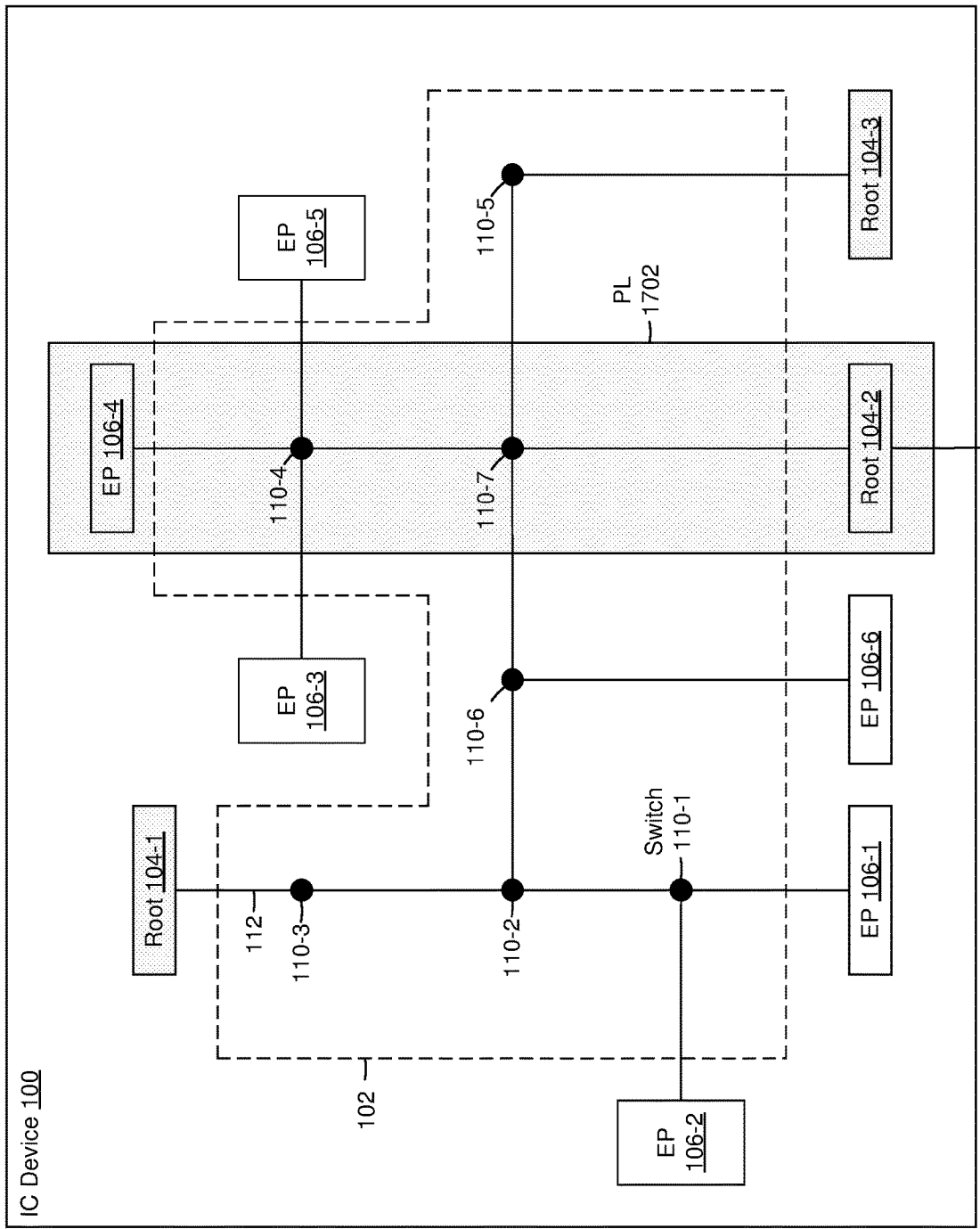
FIG. 17 is a block diagram of the IC device in which a portion of the IC device is configured in programmable logic, according to an embodiment.

Further to the description of FIG. 17, in an embodiment, root device 104 provides loopback data to bus network 102, and bus network 102 includes loop-back circuitry that is dynamically configurable to route the loopback data back to root device 104. The loopback circuitry may include multiplexer circuitry that is configurable to provide a selectable one of response data from an EP 106 and the loopback data to a data input of root device 104. Where root device 104 includes an N-bit data output and an M-bit data input, and where N≠M, the loopback circuitry may include N-bit to M-bit converter circuitry. The loopback circuitry may be configurable to route the loopback data from a multi-bit data output of a port of a multi-port switch to a multi-bit data input of the port. An EP and/or interface circuitry between the EP and a multi-port switch circuit may include loopback circuitry.

In an embodiment, switch circuits 110 include signature registers that can be used to quickly isolate bus faults. In an embodiment, each output port of a switch circuit 110 includes a respective signature register.

In an embodiment, IC device 100 is fabricated as fixed-function circuitry (e.g., application-specific integrated circuitry, or ASIC), also referred to as hardened circuitry. In another embodiment, IC device 100 includes programmable/configurable circuitry and bus network 102, or a portion thereof, is configured within the programmable/configurable circuitry, such as described below with reference to FIG. 17.

FIG. 17 is a block diagram of IC device 100, in which a portion of IC device 100 is configured in programmable logic (PL) 1702, according to an embodiment. In the example of FIG. 17, root device 104-2, EP 106-4, and a portion of bus network 102 (including switch circuits 110-4 and 110-7 and associated segments of bus network 102) are configured in PL 1702. Remaining features of IC device 100 may be fabricated in fixed-function circuitry (e.g., ASIC). In the example of FIG. 17, IC device 100 may represent a field programmable gate array. PL 1702 may be useful to provide adaptability for future developments (e.g., changes in assembly technologies such as UCIe). As an example, providing root device 104-2 in PL 1702 may be useful to connect or extend bus network 102 to another IC device subsequent to fabrication of IC device 100 (e.g., in the field or by a user).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) device, comprising:
  a plurality of end-points (EPs) that comprise functional circuitry;
  first and second root devices;
  an interconnect comprising configurable multi-port switch circuits and links amongst the multi-port switch circuits, the first root device, and the EPs; and
  control circuitry configured to:
    configure the first root device and a first subset of the EPs, via a dedicated parameter path, to communicate with one another based on a first one of multiple protocols, and configure the multi-port switch circuits, via the dedicated parameter path, to provide first data transmit paths, first data response paths, and first clock paths between the first root device and the first subset of the EPs; and
    configure the second root device and a second subset of the EPs, via the dedicated parameter path, to communicate with one another based on a second one of the protocols, and configure the multi-port switch circuits, via the dedicated parameter path, to provide second data transmit paths, second data response paths, and second clock paths between the second root device and the second subset of the EPs;
  wherein the first root device is configured to provide first data and a first clock to the first subset of the EPs via the first data transmit paths and the first clock paths, respectively, and to receive first response data from the first subset of the EPs via the first data response paths; and
  wherein the second root device is configured to provide second data and a second clock to the second subset of the EPs via the second data transmit paths and the second clock paths, respectively, and to receive second response data from the second subset of the EPs via the second data response paths.

2. The IC device of claim 1, wherein:
  the interconnect further comprises a multi-bit bus; and
  the control circuitry is further configured to allocate a first subset of bits of the multi-bit bus for the first data transmit paths and to allocation a second subset of bits of the multi-bit bus for the first data response paths.

3. The IC device of claim 1, wherein a first one of the multi-port switch circuits comprises a first port configured to receive the first data and the first clock, and a second port, and wherein the first multi-port switch circuit comprises:
  synchronous output circuitry configured to output the first data received at the first port, synchronous with the first clock;
  bypass output circuitry configured to output the first data received at the first port, asynchronously with the first clock; and
  circuitry configured to provide the output of a selectable one of the synchronous output circuitry and the bypass output circuitry to the second port.

4. The IC device of claim 1, further comprising interface circuitry configured to interface between a first one of the multi-port switch circuits and a first one of the EPs, wherein the first multi-port switch circuit comprises first and second ports, and wherein:
  the first port comprises an N-bit data input configured to receive the first data, and a clock input configured to receive the first clock, wherein N is a positive integer;
  the second port is configured to output the first data to the interface circuitry over an N-bit data link, synchronous with the first clock, and to output the first clock to the interface circuitry;
  the interface circuitry comprises first frequency converter circuitry configured to alter a data rate of the first data received over the N-bit data link by a factor of K to provide K×n bits of data at the altered data rate, wherein K and n are positive integers; and
  the interface circuitry further comprises input permutation circuitry configured to assign a selectable subset of n-bits of the K×n bits of data to the first EP over an n-bit data link at the altered data rate.

5. The IC device of claim 4, wherein the interface circuitry further comprises:
  input delay circuitry that is configurable to delay the n-bits of data by a selectable number of cycles of the first clock.

6. The IC device of claim 4, wherein interface circuitry further comprises:
  output permutation circuitry comprising an m-bit input configured to receive m-bit response data from the first EP, a K×m-bit output, wherein the output permutation circuitry is dynamically configurable to assign the m-bit response data to a selectable subset of the K×m-bit output; and
  second frequency conversion circuitry configured to alter a data rate of the K×m-bit output of the output of the output permutation circuitry by the factor K to convert the K×m-bit output of the permutation circuitry to M-bit response data having the altered data rate.

7. The IC device of claim 6, wherein:
  the output permutation circuitry further comprises circuitry configured to set unselected bits of the K×m-bit output of the permutation circuitry to a predetermined state;
  the second port of the first multi-port switch circuit is configured to receive the M-bit response data from the interface circuit; and
  the first port of the first multi-port switch circuit further comprises circuitry configured to merge the M-bit response data with M-bit response data received at one or more other ports of the first multi-switch circuit.

8. The IC device of claim 6, wherein the interface circuitry further comprises:
  output delay circuitry that is configurable to delay the m-bits response data by a selectable number of cycles of the first clock.

9. The IC device of claim 1, wherein:
  the first data comprises loopback data; and
  the interconnect further comprises loop-back circuitry that is dynamically configured to route the loopback data to the first root device.

10. The IC device of claim 1, further comprising a second root device, wherein a first one of the multi-port switch circuits comprises:
  a first port that comprises a first clock input configured to receive the first clock;
  a second port that comprises a second clock input configured to receive the second clock; and
  clock selection circuitry configured to provide a selectable one of the first and second clocks to a clock output of the first multi-port switch circuit.

11. The IC device of claim 1, wherein the interconnect is configured to simultaneously route the first and second clocks and the first and second data to the respective first and second subsets of the EPs.

12. The IC device of claim 1, wherein:
the control circuitry is further configured to configure the first root device and a third subset of the EPs, via the dedicated parameter path, to communicate with one another based on a third one of the protocols, and re-configure the multi-port switch circuits, via the dedicated parameter path, to provide third second data transmit paths, third data response paths, and third clock paths between the first root device and the third subset of the EPs; and
the first root device is further configured to provide third data and a third clock to the third subset of EPs via the third data transmit paths and the third clock paths, respectively, and to receive third response data from the third set of EPs via the third clock paths.

13. The IC device of claim 1, wherein the first root device comprises:
multiple protocol engines, each comprising circuitry configured to format data based on a respective one of the protocols;
stimulus derivation circuitry configured to output the formatted data of a selectable one of the protocol engines to the interconnect; and
response derivation circuitry configured to receive the first response data from the interconnect, and provide the first response data to a selectable one of the protocol engines.

14. The IC device of claim 1, wherein:
the interconnect is dynamically configurable to simultaneously route the first data from the first root device to the first subset of the EPs, and to route the first response data from the first subset of the EPs to the first root device.

15. The IC device of claim 14, further comprising:
delay circuitry that is configurable to delay the first data to a first EP of the first subset of the EPs by a selectable number of cycles of the first clock such that a latency of a data transmit path from the first root device to the first EP matches a latency of a data transmit path from the first root device to a second EP of the first subset of the EPs.

16. The IC device of claim 1, wherein the control circuitry is further configured to distribute configuration data to the multi-port switch circuits based on a schedule, including to:
distribute a first set of configuration data to the multi-port switch circuits to configure the multi-port switch circuits to route the first clock and the first data from the first root device to the first subset of the EPs; and
subsequently distribute a second set of configuration data to the multi-port switch circuits to dynamically reconfigure the multi-bit switch circuits to route the first clock from the first root device to a second subset of the EPs.

17. A method, comprising:
configuring a first root device and a first subset of end-points EPs of an integrated circuit (IC) device, via a dedicated parameter path of the IC device, to communicate with one another based on a first one of multiple protocols;
configuring switches of an interconnect of the IC device, via the dedicated parameter path, to provide first data transmit paths, first data response paths, and first clock paths between the first root device and the first subset of the EPs;
routing first data from the first root device to the first subset of EPs via the first data transmit paths, based on the first protocol;
routing a first clock from the first root device to the first subset of EPs via the first clock paths;
routing first response data from the first subset of EPs to the first root device via the first data response paths, based on the first protocol;
configuring the first root device and a second subset of the EPs, via the dedicated parameter path, to communicate with one another based on a second one of the protocols;
configuring the switches of the interconnect, via the dedicated parameter path, to provide second data transmit paths, second data response paths, and second clock paths between the root device and the second subset of the EPs;
routing second data from the root device to the second subset of the EPs via the second data transmit paths, based on the second protocol;
routing a second clock from the root device to the second subset of the EPs via the second clock paths; and
routing second response data from the second subset of the EPs to the root device via the second data response paths, based on the second protocol.

18. The method of claim 17, further comprising:
configuring a second root device and a third subset of end-points EPs of the IC device, via the dedicated parameter path of the IC device, to communicate with one another based on a first one of multiple protocols;
configuring the switches of the interconnect, via the dedicated parameter path, to provide third data transmit paths, third data response paths, and third clock paths between the second root device and the third subset of the EPs;
routing third data from the second root device to the third subset of EPs via the third data transmit paths, based on a third one of the protocols;
routing a third clock from the second root device to the third subset of EPs via the third clock paths; and
routing third response data from the second subset of EPs to the second root device via the third data response paths, based on the third protocol.

19. An integrated circuit (IC) device, comprising:
a plurality of end-points (EPs) that comprise functional circuitry;
a first root device;
an interconnect comprising configurable multi-port switch circuits and links amongst the multi-port switch circuits, the first root device, and the EPs; and
control circuitry configured to:
configure the first root device and a first subset of the EPs, via a dedicated parameter path, to communicate with one another based on a first one of multiple protocols, and configure the multi-port switch circuits, via the dedicated parameter path, to provide first data transmit paths, first data response paths, and first clock paths between the first root device and the first subset of the EPs; and
configure the first root device and a second subset of the EPs, via the dedicated parameter path, to communicate with one another based on a second one of the protocols, and re-configure the multi-port switch circuits, via the dedicated parameter path, to provide second data transmit paths, second data response paths, and second clock paths between the first root device and the second subset of the EPs;
wherein the first root device is configured to provide first data and a first clock to the first subset of the EPs via the first data transmit paths and the first clock paths, respectively, and to receive first response data from the first subset of the EPs via the first data response paths; and wherein the first root device is further configured to provide second data and a second clock to the second subset of EPs via the second data transmit paths and the second clock paths, respectively, and to receive second response data from the second set of EPs via the second clock paths.

* * * * *